US009025767B2

(12) United States Patent
Sovio et al.

(10) Patent No.: US 9,025,767 B2
(45) Date of Patent: May 5, 2015

(54) METHOD AND APPARATUS FOR QUERYING CONTENT PROTECTED BY IDENTITY-BASED ENCRYPTION

(75) Inventors: Sampo Juhani Sovio, Riihimäki (FI); Vesa-Veikko Luukkala, Espoo (FI)

(73) Assignee: Nokia Corporation, Espoo (FI)

( * ) Notice: Subject to any disclaimer, the term of this patent is extended or adjusted under 35 U.S.C. 154(b) by 692 days.

(21) Appl. No.: 12/730,881

(22) Filed: Mar. 24, 2010

(65) Prior Publication Data
US 2011/0235799 A1    Sep. 29, 2011

(51) Int. Cl.
  G06F 17/30    (2006.01)
  H04L 9/30    (2006.01)
  H04L 9/08    (2006.01)
  H04L 29/06    (2006.01)

(52) U.S. Cl.
  CPC .............. H04L 9/3073 (2013.01); H04L 9/083 (2013.01); *H04L 2209/60* (2013.01); *H04L 63/0442* (2013.01)

(58) Field of Classification Search
  CPC . H04L 63/0442; H04L 63/0428; H04L 9/083; H04L 9/3073; H04L 2209/60
  USPC .................... 380/30, 44, 255, 258, 277–279, 380/281–286, 178, 270; 713/182, 150, 156, 713/161, 165, 168, 171, 175, 189; 726/3, 726/27, 18; 707/747, E17.014
  See application file for complete search history.

(56) References Cited

U.S. PATENT DOCUMENTS

| 6,247,108 B1* | 6/2001 | Long ............................. 711/216 |
| 7,103,911 B2* | 9/2006 | Spies et al. ........................ 726/3 |
| 7,113,594 B2* | 9/2006 | Boneh et al. .................... 380/28 |

(Continued)

FOREIGN PATENT DOCUMENTS

| JP | 2010-4288 A | 1/2010 |
| WO | WO 2008/113952 A2 | 9/2008 |

(Continued)

OTHER PUBLICATIONS (http://en.wikipedia.org/w/index.php?title=Image%3ABDD.png) Jan. 31, 2005.*

(Continued)

*Primary Examiner* — Saleh Najjar
*Assistant Examiner* — Oleg Korsak
(74) *Attorney, Agent, or Firm* — Ditthavong & Steiner, P.C.

(57) ABSTRACT

An approach is provided for reducing communication traffic/cost and protecting content by applying recipient criteria in identity-based encryption. A criterion application of a querier causes, at least in part, transmission of a query associated with a first user described according to a first set of criteria. Based on the query, the criterion application of the querier receives one or more second sets of criteria associated with respective second users, wherein the second sets of criteria are matched, at least in part, to the first set of criteria, and wherein at least one of the second sets of criteria is used as a public key for encrypting data according to an identity-based encryption scheme. A criterion application of an information store receives the query associated with the first user, and matches one or more second sets of criteria with all or part of the first set of criteria.

20 Claims, 15 Drawing Sheets

(56) References Cited

U.S. PATENT DOCUMENTS

| | | | |
|---|---|---|---|
| 7,370,202 B2 * | 5/2008 | Appenzeller et al. | 713/171 |
| 7,571,321 B2 * | 8/2009 | Appenzeller et al. | 713/171 |
| 7,580,521 B1 | 8/2009 | Spies et al. | |
| 2002/0059201 A1 | 5/2002 | Work | |
| 2007/0242827 A1 * | 10/2007 | Prafullchandra et al. | 380/241 |
| 2008/0049937 A1 | 2/2008 | Pauker et al. | |
| 2008/0082512 A1 * | 4/2008 | Hogan et al. | 707/3 |
| 2010/0211779 A1 | 8/2010 | Sundaram | |

FOREIGN PATENT DOCUMENTS

| | | |
|---|---|---|
| WO | WO 2010/008812 A1 | 1/2010 |
| WO | WO 2010/069180 A1 | 6/2010 |

OTHER PUBLICATIONS http://en.wikipedia.org/wiki/File:BDD_simple.svg Oct. 20, 2005.*

Office Action for related U.S. Appl. No. 12/730,884 dated Jun. 27, 2012, pp. 1-46.

Binary decision diagram. Accessed: Apr. 22, 2010, http://en.wikipedia.org/wiki/Binary_decision_diagram, pp. 1-5.

Boneh, D. et al., Identity-Based Encryption from the Weil Pairing, SIAM J. of Computing, vol. 32, No. 3, pp. 586-615, 2003. Accessed: May 17, 2010, http://crypto.stanford.edu/~dabo/papers/ibe.pdf, pp. 1-31.

The Pairing-Based Crypto Lounge, Accessed: May 18, 2010, http://www.larc.usp.br/~pbarreto/pblounge.html, pp. 1-31.

* cited by examiner

METHOD AND APPARATUS FOR QUERYING CONTENT PROTECTED BY IDENTITY-BASED ENCRYPTION

BACKGROUND

Service providers (e.g., wireless, cellular, Internet, content, social network, etc.) and device manufacturers are continually challenged to deliver value and convenience to consumers by, for example, providing compelling network services and advancing the underlying technologies. One area of interest has been in ways to facilitate sharing of content on existing networks while maintaining user privacy and confidentiality through, for instance, encryption. As a result, the number of systems and platforms facilitating content sharing using identity-based encryption is increasing. For example, such identity-based encryption are keyed to criteria (e.g., characteristics, properties, interests, etc.) associated with potential recipients as opposed to specific recipients. In this way, identity-based encryption permits distributing messages to target recipients without knowing the identities of the target recipients. As users continue to increase their reliance on content sharing and querying content protected by identity-based encryption via networks, the number of search queries and the search results protected by identity-based encryption also increase. Consequently, service providers and device manufacturers face the challenge of providing sufficient communication and network resources to support queries and results protected by identity-based encryption.

SOME EXAMPLE EMBODIMENTS

Therefore, there is a need for an approach for querying content protected by identity-based encryption.

According to one embodiment, a method comprises causing, at least in part, transmission of a query associated with a first user, the first user being described according to a first set of criteria. The method also comprises based, at least in part, on the query, receiving one or more second sets of criteria associated with respective second users, wherein the second sets of criteria are matched, at least in part, to the first set of criteria, and wherein at least one of the second sets of criteria is used as a public key for encrypting data according to an identity-based encryption scheme.

According to another embodiment, an apparatus comprising at least one processor, and at least one memory including computer program code, the at least one memory and the computer program code configured to, with the at least one processor, cause, at least in part, the apparatus to transmit a query associated with a first user, the first user being described according to a first set of criteria. The apparatus is also caused to based, at least in part, on the query, receive one or more second sets of criteria associated with respective second users, wherein the second sets of criteria are matched, at least in part, to the first set of criteria, and wherein at least one of the second sets of criteria is used as a public key for encrypting data according to an identity-based encryption scheme.

According to another embodiment, a computer-readable storage medium carrying one or more sequences of one or more instructions which, when executed by one or more processors, cause, at least in part, an apparatus to transmit a query associated with a first user, the first user being described according to a first set of criteria. The apparatus is also caused to based, at least in part, on the query, receive one or more second sets of criteria associated with respective second users, wherein the second sets of criteria are matched, at least in part, to the first set of criteria, and wherein at least one of the second sets of criteria is used as a public key for encrypting data according to an identity-based encryption scheme.

According to another embodiment, an apparatus comprises means for causing, at least in part, transmission of a query associated with a first user, the first user being described according to a first set of criteria. The apparatus also comprises means for based, at least in part, on the query, receiving one or more second sets of criteria associated with respective second users, wherein the second sets of criteria are matched, at least in part, to the first set of criteria, and wherein at least one of the second sets of criteria is used as a public key for encrypting data according to an identity-based encryption scheme.

According to one embodiment, a method comprises receiving a query associated with a first user, the first user being described according to a first set of criteria. The method also comprises matching one or more second sets of criteria with all or part of the first set of criteria, wherein the matching defines respective second users who are qualified to receive the query, and wherein at least one of the second sets of criteria is used as a public key for encrypting data associated with a respective second user according to an identity-based encryption scheme. The method further comprises causing, at least in part, transmission of the second sets of criteria in response to the query.

According to another embodiment, an apparatus comprising at least one processor, and at least one memory including computer program code, the at least one memory and the computer program code configured to, with the at least one processor, cause, at least in part, the apparatus to receive a query associated with a first user, the first user being described according to a first set of criteria. The apparatus is also caused to match one or more second sets of criteria with all or part of the first set of criteria, wherein the matching defines respective second users who are qualified to receive the query, and wherein at least one of the second sets of criteria is used as a public key for encrypting data associated with a respective second user according to an identity-based encryption scheme. The apparatus is further caused to transmit the second sets of criteria in response to the query.

According to another embodiment, a computer-readable storage medium carrying one or more sequences of one or more instructions which, when executed by one or more processors, cause, at least in part, an apparatus to receive a query associated with a first user, the first user being described according to a first set of criteria. The apparatus is also caused to match one or more second sets of criteria with all or part of the first set of criteria, wherein the matching defines respective second users who are qualified to receive the query, and wherein at least one of the second sets of criteria is used as a public key for encrypting data associated with a respective second user according to an identity-based encryption scheme. The apparatus is further caused to transmit the second sets of criteria in response to the query.

According to another embodiment, an apparatus comprises means for receiving a query associated with a first user, the first user being described according to a first set of criteria. The apparatus also comprises means for matching one or more second sets of criteria with all or part of the first set of criteria, wherein the matching defines respective second users who are qualified to receive the query, and wherein at least one of the second sets of criteria is used as a public key for encrypting data associated with a respective second user according to an identity-based encryption scheme. The apparatus further comprises means for causing, at least in part, transmission of the second sets of criteria in response to the query.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
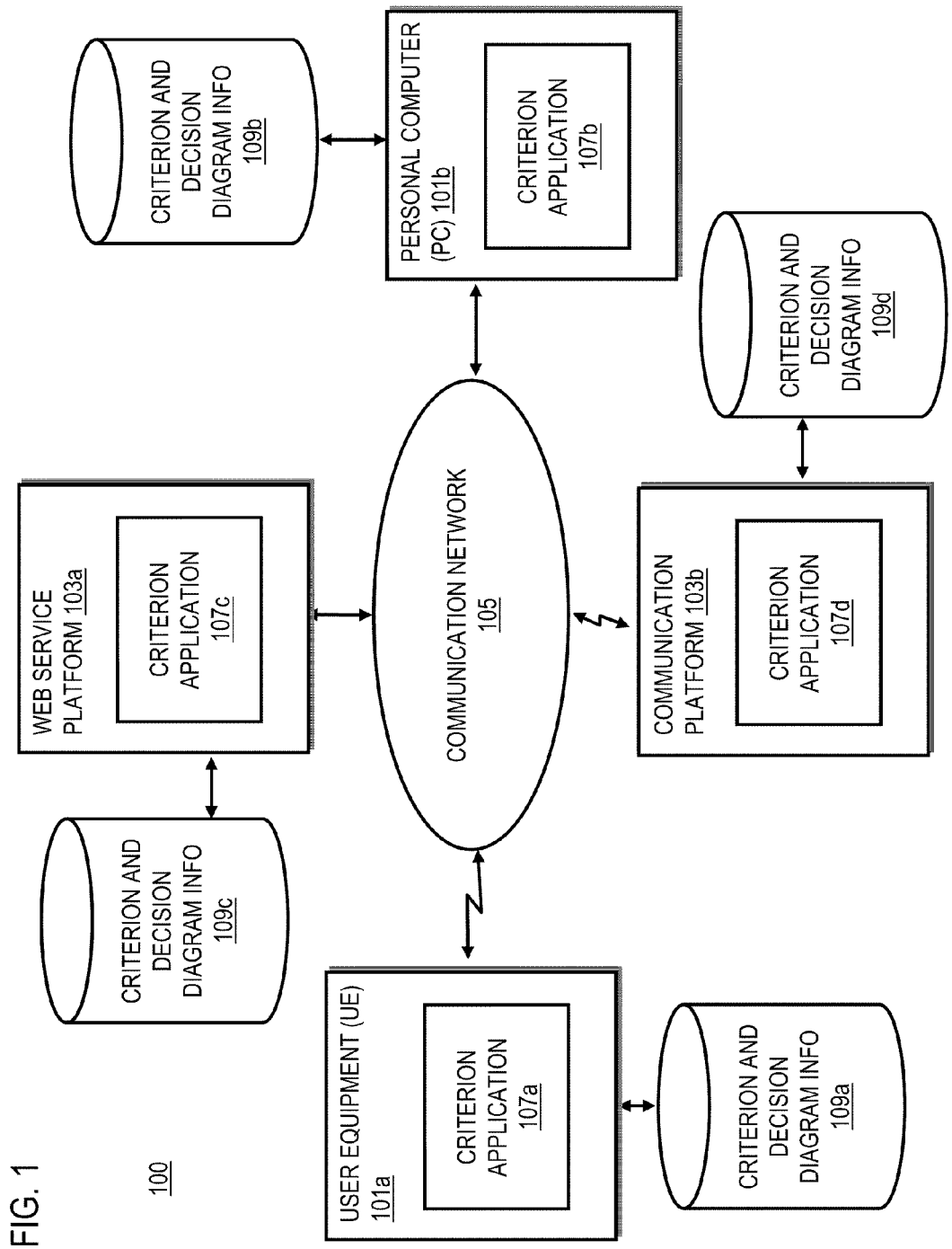
FIG. 1 is a diagram of a system capable of querying content protected by identity-based encryption, according to one embodiment.

A method and apparatus for querying content protected by identity-based encryption are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Identity-based encryption (IBE) is a public-key technology. IBE is different from other public-key technologies in that IBE keys are calculated with unique information about the identity of the user (e.g., a user's email address), instead of being generated randomly. Identity-based systems allow any party to generate a public key from a known identity value such as an ASCII string or information in any data representation. To operate, a trusted third party, called the private key generator (PKG) first publishes a master public key, and retains a corresponding master private key. Given the master public key, any party can compute a public key corresponding to the identity ID by combining the master public key with the identity value. To obtain a corresponding private key, an authorized party contacts the PKG, which uses the master private key to generate the private key for the identity ID. Since public keys are derived from identity IDs, IBE eliminates the need for a public key distribution infrastructure. This further eliminates the need for a sender and a receiver in an IBE-based messaging system to interact with each other, before sending secure messages. The authenticity of the public keys is guaranteed as long as the transport of the private keys to the corresponding user is kept secure. IBE-encrypted messages can use standard message formats, such as the cryptographic message syntax (CMS).

As used herein, the term "decision diagram" refers to a compact graphical and/or mathematical representation of a decision situation, sets, or relations. A decision diagram, for example, may be a binary decision diagram (BDD) or a reduced ordered binary decision diagram (ROBDD). A BDD is "ordered" if different variables appear in the same order on all paths from the root. A BDD is "reduced" if any isomorphic subgraphs of its graph are merged and any nodes whose two child nodes are isomorphic are eliminated. Isomorphic subgraphs of the same decision diagram have similar appearance but originate from different sources. A ROBDD is a group of Boolean variables in a specific order and a directed acyclic graph over the variables. A directed acyclic graph (DAG) contains no cycles. This means that if there is a route from node A to node B then there is no way back. Although the term BDD almost always refers to reduced ordered binary decision diagram (ROBDD), this application refers to ROBDD separately from BDD to avoid confusion.

A decision diagram may be used to organize any data, including one or more recipient criteria, into a tree-type data structure that permits identification of a result by traversing various branches of the structure. Although various embodiments are described with respect to applying recipient criteria, it is contemplated that the approach described herein may be used with other data that can be organized into a tree-type data structure. The term "AugBDD" refers to an augmented ROBDD which is augmented information including the ROBDD and at least one of a header with a hash identifier ("hash ID"), a construction history of the ROBDD, keyed hash IDs, and cardinality information (e.g., relationships between data tables, constraints on the types and number of class instances a property may connect with respect to a given ontology, etc.). Each ROBDD is given a hash ID by operating a hash function over its ROBDD graph structure. Ideally, the hash function would never produce the same hash ID for two different ROBDDs.

As used herein, the term "construction history information" of a hash identifier of interest includes at least one or more other hash identifiers corresponding to a respective one or more other decision diagrams used to construct a decision diagram corresponding to the hash identifier of interest. The construction history also includes identification of one or more Boolean operators applied to the other hash identifiers listed in history. Since the ROBDD may be constructed by BDD operations from other ROBDDs, a succinct representation of the ROBDD including the construction history of the ROBDD and a hash ID can be sent instead of the ROBDD, to reduce data traffic. In one embodiment, plain hash IDs form the basis for the communication. A keyed hash ID may be added in the communication along with a key ID. This allows the recipient to ensure that the keyed hash ID can be created from the corresponding graph (or the plain hash ID) by using the produced key. To create a keyed hash ID, the data of the ROBDD is serialized to be input into a keyed hash function, such as HMAC-SHA1, HMAC-SHA-256, etc. The keyed hash function allows entities to share the same secret key and to independently ensure that the resulting hash IDs were created by an entity having the secret key. Key IDs may correspond to different groups, such as different social networks. A key ID together with an ROBDD graph constitute proof that the ROBDD has been constructed by the owner of the key ID.

FIG. 1 is a diagram of a system capable of querying content protected by identity-based encryption, according to one embodiment. As discussed above, the need for content sharing and querying content protected by identity-based encryption ("IBE") via networks is growing. All participants of the system have obtained an IBE master public key (MK) and domain parameters (DP) from a private key generator (PKG). When applying recipient criteria in an identity-based encryption system, a sender will use recipient criteria (C) as a key to encrypt secret data (S), publish encrypted data itself or via an information store for targeted recipients to decrypt. In one embodiment, the recipient criteria may be a user personality feature such as age, gender, personal interest, etc.; technical capability of receiving device such as digital rights management compliance; device usage patterns; environmental conditions in which the device is used; context information associated with the device such as location, time, day; other predetermined conditions; or a combination thereof. By way of example, any user of the system can send out a query for content data. An information store (e.g., Nokia's Ovi Store) on the internet can match querier criteria (C') against locally or externally available recipient criteria (C) that were used to encrypt the content data. The information store sends matched recipient criteria (C) to the querier. The querier reviews and selects some or all of the received recipient criteria (C), and contacts the PKG with to obtain a decryption key (DK) to decrypt content data that was encrypted by the selected recipient criteria. A trusted third party, i.e., PKG, uses the recipient criteria (C) and the querier criteria (C') to screen out authorized parties, before delivering a decryption key to the authorized parties. The PKG only needs to calculate a decryption key based upon the recipient criteria when necessary.

In one embodiment, instead of waiting to receive the query directly from the querier, the sender may request from the querier one or more encrypted queries that was IBE encrypted with sender criteria (Cs). The sender criteria (Cs) are set by the querier to screen for senders satisfying the sender criteria (Cs). The sender criteria (Cs) are used to IBE-encrypt the query. Upon receiving the request or query for an encrypted query, the querier matches sender criteria (Cs) of the sender against all sender criteria (Cs') stored locally or externally. The querier then sends to the sender matched sender criteria (Cs') for the sender to select specific matched sender criteria (Cs') of interest and then to request a decryption key to decrypt corresponding IBE encrypted queries.

As the amount of IBE encrypted data and content queries increase, the information space, that includes the information store and the PKG, has to provide mechanisms and infrastructure to allow queriers to find suitable encrypted data based upon querier criteria (C').

The system 100 of FIG. 1 addresses this problem with solutions of effectively matching the two sets of criteria C and C', and verifying whether the querier actually satisfies the querier criteria C'. In this case, the information store and the PKG work behind the scene such that the content queriers only need to send out querier criteria C' in order to decrypt encrypted secret data that may contain content of interest. In other words, content of interest is identified by matching a querier criteria (C') against information or data encrypted using recipient criteria (C) that match the querier criteria (C') rather than searching for content that match the querier's query.

In one embodiment, participants of the system 100 obtain an IBE master public key (MK) and domain parameters (DP) from a private key generator (PKG). In another embodiment, the common IBE parameters are available in an information store, and access to the common IBE parameters in the information store can be controlled by existing access control mechanisms, such as passwords, electronic keys, etc. This occurs once, for example at the time of manufacturing the UE 101a, 101b that are later used by the participants, and does not need to occur again. In one embodiment, the system 100 uses IBE master public key (MK), domain parameters (DP), and the recipient criteria (C) to encrypt the secret data (D) through an IBE decryption function: E_D=ibe_encrypt (MK, DP, C), and publishes the encrypted data (E D), for example, at an information store.

By way of example, a querier who satisfies querier criteria (C') may query the cloud for content data through a function: e1=query (content). The term "cloud" is used as a metaphor for the Internet, based on the cloud drawing used to depict the Internet in computer network diagrams as an abstraction of the underlying infrastructure it represents to provide services of processing power, storage, software or other computing services. Typically these services are rented by a service provider.

The cloud matches querier criteria (C') against all recipient criteria (C) available locally or externally. The cloud then sends matched recipient criteria (C) to the querier for the querier to select one or more matched recipient criteria (C) that the querier is interested. The querier then contacts the PKG with C to obtain a decryption key via a function: pk1=offer_certeria (C). The querier then uses the decryption key to decrypt any published encrypted secret data (D) encrypted by the selected recipient criteria (C) into decrypted content data (D') through an IBE decryption function: D'=ibe_decrypt (e1, DK, DP).

In another embodiment, the information store stores the published encrypted secret data E_D in association with the criteria C, such as by tagging E_D with C, thereby controlling different kinds of access to C. For example, the information store maintains the association between E_D and C, while making C invisible to the party.

After verifying that the party meets the recipient criteria, the PKG sends the party a decryption key for decrypting the encrypted secret data. As the use of encryption keys for maintaining user privacy grows significantly, the system 100 of FIG. 1 represents the recipient criteria C in an information representation format or structure (e.g., a RDF graph), and uses the RDF graph as a public key to encrypt the secret data, and publishing the encrypted data S.

The system 100 also supports a content querier to represent querier criteria C' in the information representation format or structure (e.g., a RDF graph), and uses the RDF graph to query for secret data encrypted with the same querier criteria C'. The PKG then verifies r whether the content querier meets the querier criteria C'. If so, the PKG sends the content querier a decryption key, and the content querier can use the decryption key to decrypt the encrypted data.

When communication is anonymous, the decision to reveal the identities of the communicating parties is left up to the parties involved. There may be no need or desire by the communicating parties to reveal their true identities after communicating the secret data. Some users may not want to possess the secret data or the identification of the parties, or they want to avoid such data be compiled into histories of their activities.

To allow queriers to find suitable and appropriate content, the system 100 labels encrypted content (i.e., secret data for target recipients satisfying the recipient criteria C) with the recipient criteria C to increase query efficiency. As discussed, the derivatives of the recipient criteria C (such as a hash ID or keyed hash ID of the recipient criteria) can be used as the labels to reduce data size, network traffic, and storage space. Keyed hash IDs provide one additional layer of security; however, it takes time and network resources to transport a corresponding key ID and decrypt a keyed hash ID with the key corresponding to the key ID. Alternatively, plain/unkeyed hash IDs are used for efficiency.

The system 100 supports a content querier to interact with the information store in different ways to obtain encrypted content data. In one embodiment, a content querier queries the information store with different criteria to obtain encrypted packets which can be decrypted by those criteria. In another embodiment, the content querier publishes a representation of information at the information store so that the information store can match the published information against all of internally and/or externally available criteria and report matches to the content querier. The query, the querier criteria, and the recipient criteria are very flexible in terms of length and content, since they are not limited by any formats set in existing websites. Therefore, the sender and the querier can be as creative as they want to be, without concerning the cost of publishing length set by newspaper, websites, etc. The information store returns with a list of results with matching degrees (e.g., percentages), whether there is any 100% match.

In yet another embodiment, the content querier obtains an encrypted packet from the information store, deduces based on the label of the packet whether suitable criteria are available locally, and then proceeds to decrypt the packet by contacting the PKG.

The system 100 offers several ways for the PKG to verify the integrity of a content querier that requests a decryption key. In one embodiment, the PKG verifies whether the content querier actually possesses/satisfies the querier criteria C' based on the access rights of the content querier. In another embodiment, the PKG verifies the content querier based upon available history involving the querier. In another yet embodiment, the PKG outsources the information store to verify whether the content querier actually possesses/satisfies the querier criteria C'. The information store checks locally or with other information stores to verify the querier-offered criteria C'.

To simplify the discussion, RDF graphs are used as one example of representation of the recipient, querier, and sender criteria. In one embodiment, RDF graphs represent decision diagrams and describe resources with classes, properties, and values. A node/resource is any object which can be pointed to by a uniform resource identifier (URI), properties are attributes of the node, and values can be either atomic values for the attribute, or other nodes. RDF Schema provides a framework to describe application-specific classes and properties. Classes in RDF Schema are like classes in object oriented programming languages. This allows resources to be defined as instances of classes, and subclasses of classes.

The RDF graphs are represented or encoded in decision diagrams which describe the properties and relations of different classes. A class has a name and potentially several associated properties, and it may be a subclass of another class. Possible properties are represented as arcs from one class node to other class nodes. These property-arcs can be properties of the object which have values (that are the nodes targeted by the property arcs).

Each RDF-graph includes a set of unique triples in a form of subject, predicate, and object, which allow expressing graphs. For example, in this piece of information "Jenna is a Dave Stewart fan," the subject may be Jenna, the predicate may be is, and the object may be Dave Stewart fan. The simplest RDF-graph is a single triple. Any node or entity can store unconnected graphs. As later explained in more detail, the approach described herein can be adapted in a smart space that includes the semantic web and has distributed nodes and entities that communicate RDF-graphs (e.g., via a blackboard or a shared memory).

To further reduce the size of the criterion representation, the system 100 uses, for instance, a subset of the RDF graph to represent the recipient criteria. By way of example, a compact representation of the RDF graph in the form of a reduced ordered binary decision diagram (ROBDD) is used as a subset of the RDF graph. In another embodiment, instead of the ROBDD, an augmented ROBDD ("AugBDD") including a hash identifier is employed to further reduce the size of criterion representation. As the size of the criterion representation is further reduced, the storage required for the criterion representation is also reduced. More specifically, the system 100 provides for hash tables listing known or existing RDF graphs along with their corresponding respective ROBDDs, hash identifiers and other related information. A user may then consult one of the hash tables to obtain a corresponding decision diagram with a hash identifier.

One consideration for selecting the RDF graph encoding scheme is that the encoding scheme should generate a hash identifier for a decision diagram with a reasonably small size while maintaining uniqueness of the hash identifier such that any two decision diagrams will not have identical hash identifiers. For example, upon receiving a search query, the system 100 serializes the decision diagram into variables and then feeds the variables into a hash function thereby obtaining unique hash identifiers corresponding to the decision diagram. In addition, the system 100 can truncate the hash identifiers to a specific bit size while maintaining their uniqueness, thereby saving communication resources (e.g., reducing network bandwidth) while transmitting the same information.

In other words, to address the problem of the traditional public encryption systems, a system 100 of FIG. 1 introduces the capability to query content protected by identity-based encryption. The RDF graphs of recipient, querier, and sender criteria are encoded to decision diagrams to be communicated between the nodes (e.g., the UE 101) and entities (e.g., the platforms 103, etc.). To further reduce communication traffic, the system 100 encodes (e.g., hashes) the decision diagrams of the criteria into hash IDs, and avoids sending decision diagrams of the criteria by sending the hash IDs (and optionally a construction history of the decision diagrams). The reduced ordered binary decision diagram (ROBDD) is used as an efficient representation for a binary decision diagram representing the criteria and hashed with a hash function into a hash identifier (hash ID).

As shown in FIG. 1, the system 100 comprises a user equipment (UE) 101a having connectivity to a personal computer 101b, a web service platform 103a and a communication platform 103b via a communication network 105. Each of the UE 101a, the personal computer 101b, the web service platform 103a and the communication platform 103b has a criterion application 107 and a database 109 for storing hash identifier and decision diagram information. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101a, the personal computer 101b, the web service platform 103a and the communication platform 103b communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
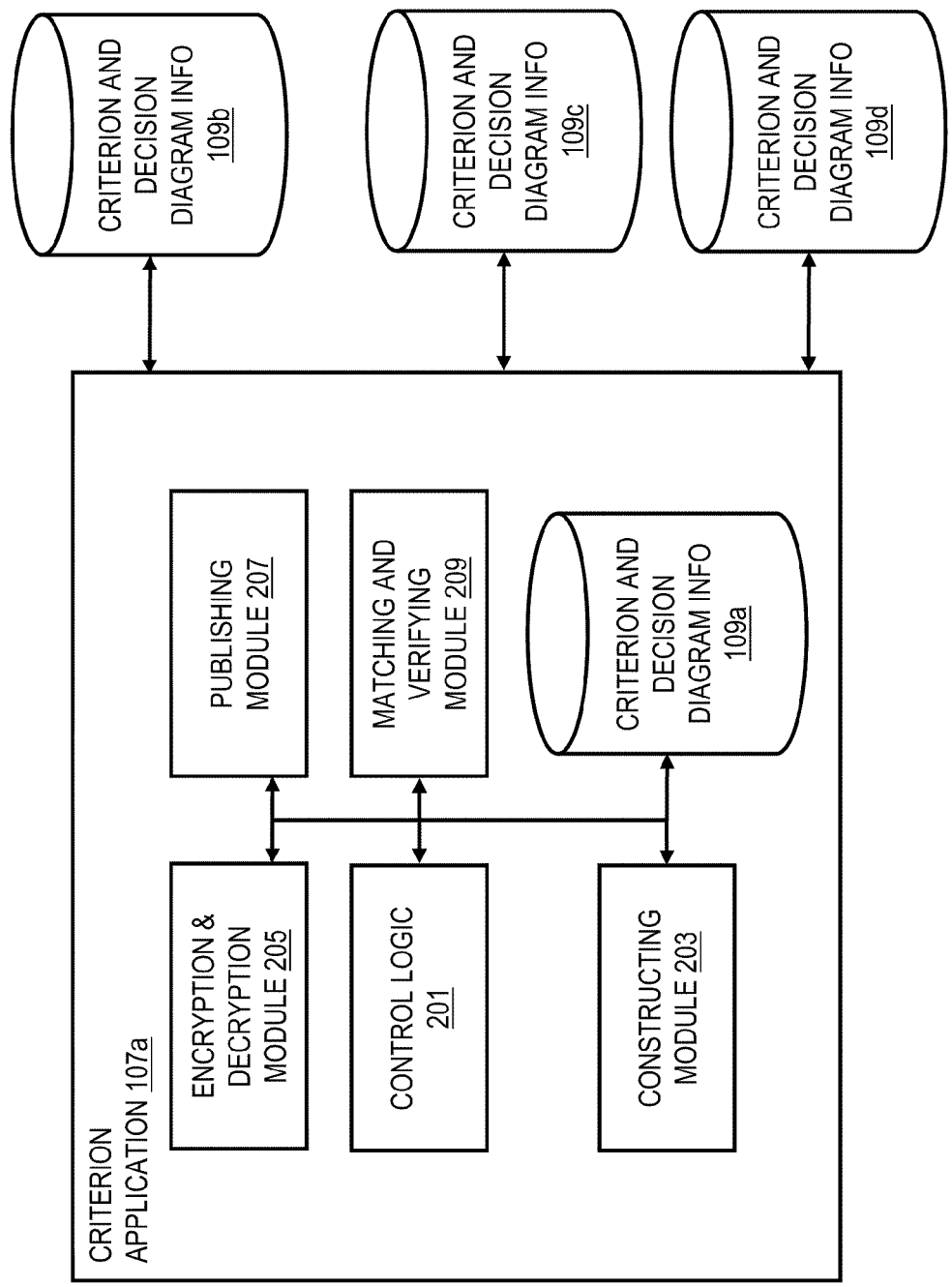
FIG. 2 is a diagram of the components of a criterion application, according to one embodiment.

FIG. 2 is a diagram of the components of the criterion application 107a, according to one embodiment. By way of example, the criterion application 107a includes one or more components for querying content protected by identity-based encryption. In certain embodiments, the criterion application 107a may be a widget. By way of example, widgets are light-weight applications based on standard web technologies (e.g., web runtime (WRT)—a web application runtime environment included in many browsers) that serve as frontends or clients to web-based or other content and functions. Widgets provide a convenient means for presenting information and accessing services. It is contemplated that the functions of these components may be combined in one or more components or performed by other components of equivalent functionality.

In this embodiment, the criterion application 107a includes a control logic 201 for controlling the operation of the criterion application 107a, and a constructing module 203 for constructing a RDF graph from one or more recipient, querier, and sender criteria, a ROBDD from the RDF graph, a hash identifier of the ROBDD, and a keyed hash identifier of the ROBDD. The constructing module 203 also constructs a RDF graph from secret data and queries, a ROBDD from the RDF graph, a hash identifier of the ROBDD, and a keyed hash identifier of the ROBDD. The criterion application 107a also includes an encryption/decryption module 205 for encrypting the secret data and the queries using one of the ROBDD, hash identifier, or keyed hash identifier of the criteria as a public key, and decrypting the encrypted secret data with a decryption key. The criterion application 107a further includes a publishing module 207 for publishing the encrypted secret data and queries. The criterion application 107a further includes a matching and verifying module 209 for matching received criteria against locally or eternally stored criteria, and for verifying the received criteria are actually met by a source of the received criteria. The criterion applications 107b, 107c, 107d have the same or similar features of the criterion application 107a.

Figure 14:
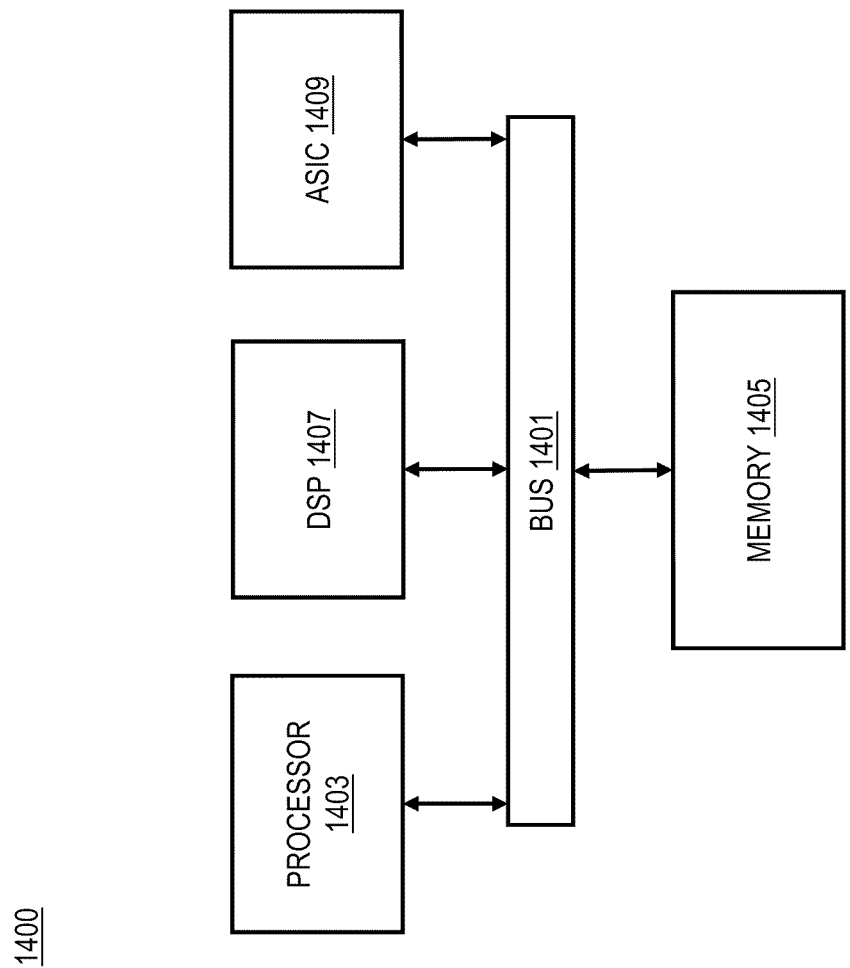
FIG. 14 is a diagram of a chip set that can be used to implement an embodiment of the invention.

FIG. 3A is a flowchart of a process for querying content protected by identity-based encryption, according to one embodiment. In one embodiment, the criterion application 107a of the UE 101 (e.g., Jenna's device) performs the process 300 and is implemented in, for instance, a chip set including a processor and a memory as shown in FIG. 14. In step

301, the criterion application 107a causes, transmission of a query (e.g., songs of Dave Stewart) associated with a first user (e.g., Jenna), the user being described according to a first set of criteria.

By way of example, in social networking and applications, a user may want to find data others shared online. The sender who made the shared data available only for people associated with some data, applications and devices that meet some arbitrary criteria. These recipient criteria may include: (1) personality features such as age, gender, personal interest, etc.; (2) receiving device must fulfill some technical requirements, such as Blu-ray, digital right management (DRM) compliant, etc.; (3) recipient as a frequent user of certain applications, media content items, certain type of media content, etc.; (4) any user defined conditions; (5) any enforced conditions, e.g., enforced by a server, device, player, etc.; (6) any sensed physical values including a temperature, location, etc. of a device or of the environment the device is situated; or (7) any logical combinations of above conditions.

In many circumstances, a user/sender may want to share information with just people of like mind and/or same hobbies (e.g., people meeting certain recipient criteria). In other words, the user may only want to reach out people meeting these criteria without knowing their actual identification. In this scenario, the criterion application 107a of the user/sender encrypted the information to be shared (e.g., songs of Dave Stewart recorded in a live concert) using the recipient criteria itself (e.g., an age range and music preferences) as a public key of identity-based encryption.

Based, at least in part, on the query (e.g., songs of Dave Stewart), the criterion application 107a, receives (e.g., from an information store or the internet) one or more second sets of criteria (e.g., female fans of Dave Stewart age 18-24) associated with respective second users, wherein the second sets of criteria are matched, at least in part, to the first set of criteria, and wherein at least one of the second sets of criteria is used as a public key for encrypting data (e.g., songs of Dave Stewart recorded in a live concert) according to an identity-based encryption scheme (Step 303). When transmitting only the recipient criteria and not the encrypted content, the network traffic is reduced. The criterion application 107a can query the encrypted content later, if necessary.

FIG. 3B is a flowchart of a process for querying content protected by identity-based encryption, according to one embodiment. In one embodiment, the criterion application 107c (e.g., in the information store) of the web service platform 103a performs the process 320 and is implemented in, for instance, a chip set including a processor and a memory as shown in FIG. 14. In step 321, the criterion application 107c of the information store receives the query (e.g., songs of Dave Stewart) associated with the first user (e.g., Jenna), the first user being described according to a first set of criteria. The criterion application 107c, matches one or more second sets of criteria (i.e., recipient criteria, e.g., female fans of Dave Stewart age 18-24) with all or part of the first set of criteria (i.e., querier criteria, e.g., Jenna's criteria), wherein the matching defines respective second users who are qualified to receive the query, and wherein at least one of the second sets of criteria is used as a public key for encrypting data associated with a respective second user according to an identity-based encryption scheme (Step 323). The criterion application 107c causes, at least in part, transmission of the second sets of criteria (i.e., recipient criteria, e.g., female fans of Dave Stewart age 18-24) in response to the query (Step 325). An example process used in the approach of system 100 is described in more detail with respect to FIG. 4 below.

Figure 4:
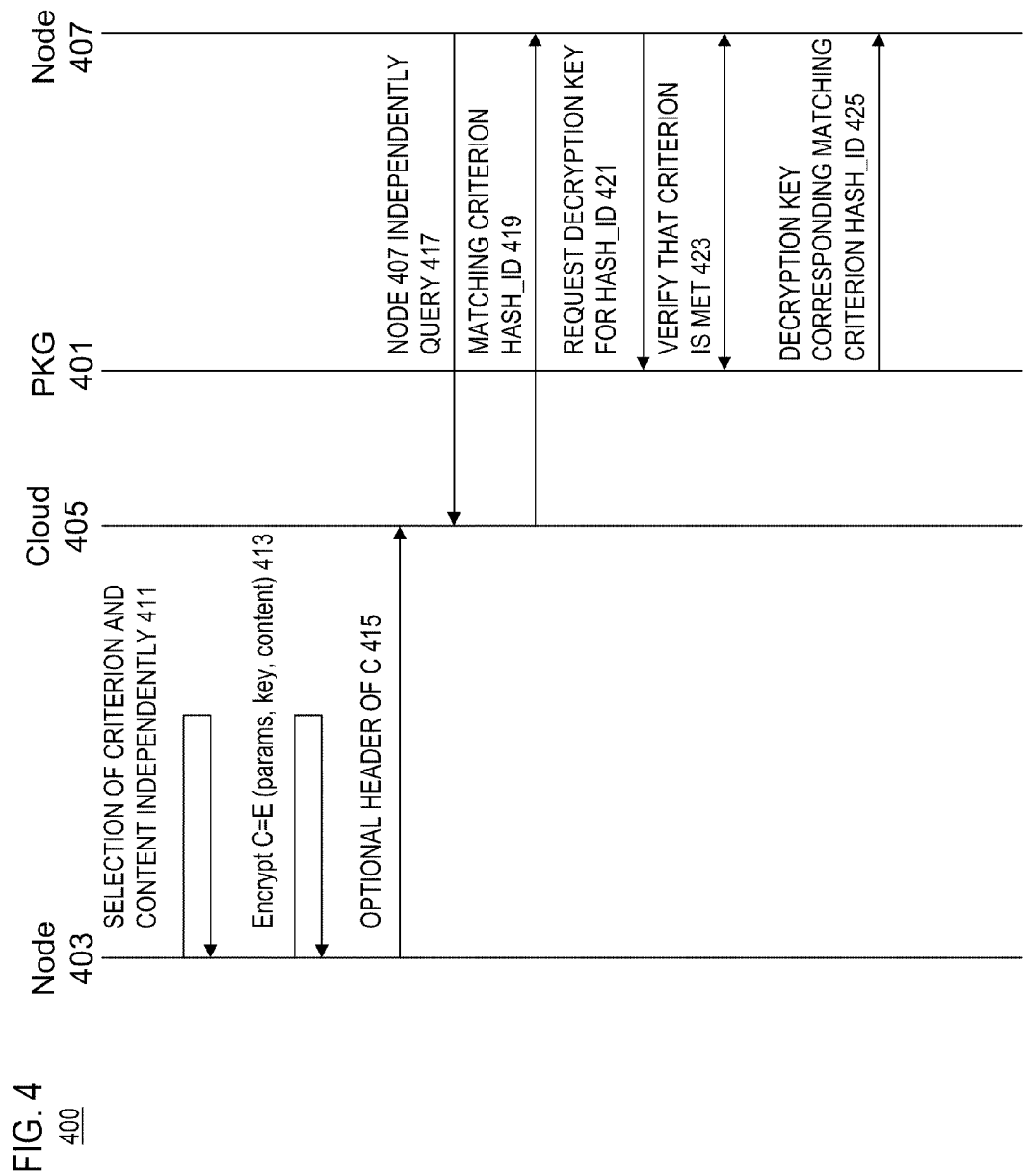
FIG. 4 is an operational diagram for content encryption, according to one embodiment.

FIG. 4 is an operational diagram for content encryption, according to one embodiment. Before the operation starts, a PKG 401 sends common IBE parameters ("params") to all the entities such as a node 403, an information store 405, and another node 407. The distribution of common parameters is typically done once, for instance, at a factory during manufacturing of the nodes 403 and 407. In one embodiment, the node 403 is the sender of the secret data, and the node 407 is the querier for data. The sender and the querier can be end users. In another embodiment, at least one of the nodes 403, 407 is an information store, a service provider, or other business entities. The encryption operation starts from a process 411 in which the node 403 independently selects one or more recipient criteria and secret data (i.e., the user's favorite song of Dave Stewart). The node 403 then encrypts the secret data using the recipient criteria (e.g., females fans of Dave Stewart age 18-24) as a public key using a formula, e.g., C=E (params, key, content) in a process 413, where C is the encrypted secret data and E is an encryption function.

In a process 415, the node 403 has an option to send to the information store 405 a message including the recipient criteria together with a header. For example, the message can be an email, SMS, EMS, MMS, etc.; and the header can describe or otherwise specify the recipient criteria. When the recipient criteria are sent in a message without a header, the information store 405 or any intended recipient can read the recipient criteria transmitted through a logically separate message. The separate message makes the recipient criteria visible, i.e., not being encrypted. On the other hand, if the recipient criteria are not described in the header or transmitted through the separate message, the intended recipient, that meets the specified criteria and/or has a corresponding decryption key given by the information store 405, cannot determine whether to decrypt the published encrypted secret data C before trying to decrypt C.

When the message is sent with a header containing the recipient criteria, the information store 405 can take action based upon the header without reading the message body. Further, if the information store 405 makes the header available for everyone, the intended recipient (e.g., the node 407) can determine whether to decrypt C before trying to decrypt C. It is noted that under some conditions, although non-intended recipients (e.g., as other nodes) may have no key to open up or decrypt the published encrypted secret data, the non-intended recipients may nonetheless use the recipient criteria described in the header to generate other encrypted secret data (e.g., spam, etc.) targeted at the group of intended recipients. When the node 403 is concerned about such spam attacks or other unwanted information resulting from the recipient criteria described in the header, the node 403 can still include the header in the message while requesting that information store 405 not to publish the recipient criteria.

Information on IBE standard parameters is available in "Network Working Group RFC5091: Identity-Based Cryptography Standard (IBCS) #1: Supersingular Curve Implementations of the BF and BB1 Cryptosystems" by Boyen et al., December 2007, which is hereby incorporated in its entirety by reference. By way of example, the following system parameters are set to be compatible with Type-1 Curve implementation (see section 4.4.2 of RFC5091) under the Boneh-Franklin scheme which is an IBE scheme (2001) well known in the art. It is noted that this system 100 can be adapted to optimal and efficient IBE schemes other than the Boneh-Franklin scheme. In one embodiment, a setup algorithm is run by the PKG 401 one time for creating the whole IBE environment and specifying the IBE scheme to be used. In one scheme, a master private key is kept secret and used to derive users' private keys. The system parameters are made public. In one embodiment, communicating parties (e.g., the PKG 401, the node 403, the information store 405, the recipient 407, etc.) share common system/domain parameters consisting of:

1. A curve equation, e.g., y^2=x^3+1 (mod p). Notation ^ means exponentiation, for example 3^2=9. This curve is super singular elliptic curve defined over prime field modulus p.

2. A prime number p (e.g., of 160-bit long), such that p−11 is divisible by 12.

3. A prime number q (e.g., of 80-bit long), which is factor of p+1.

4. A cryptographic hash function, for example SHA-1 or SHA-256.

5. A generator point G=(gx,gy).

6. A domain specific common public key Pub on the curve, that is a point (x,y) of the curve y^2=x^3+1, Pub=s*G, where s is master key. For example, the Pub can be computed from a master secret S. Since s is not part of domain parameters, revealing Pub does not reveal the s.

It is described on page 57 of RFC5091 that the security levels of the system 100 can be achieved with certain parameter sizes. RSA (which stands for Rivest, Shamir and Adleman who first publicly described it) is an algorithm for public-key cryptography, and is widely used in electronic commerce protocols. Typically, 1024-bit RSA corresponds to 80-bit of security. This security level can be achieved with a 512-bit p and a 160-bit q. 2048-bit RSA is recommended nowadays, and it corresponds to 112-bit security. This security level can be achieved with a 1024-bit p and a 224-bit q.

The decryption operation starts from the querier node 407 that independently sets and sends a query for content data (i.e., the user's favorite song of Dave Stewart) to the information store 405 in a process 417. The query may explicitly or implicitly include information of the node 407 (i.e., querier criteria C'). The querier criteria may include (1) personality features such as age, gender, personal interest, etc.; (2) receiving device fulfilling some technical requirements, such as Blu-ray, digital rights management (DRM) compliance, etc.; (3) querier as a frequent user of certain applications, media content items, certain type of media content, etc.; (4) any user defined conditions; (5) any enforced conditions, e.g., enforced by a server, device, player, etc.; (6) any sensed physical values including a temperature, location, etc. of a device or of the environment the device is situated; or (7) any logical combinations of above conditions. In another embodiment, the query is explicitly or implicitly associated information within a data mining depository include the (1)-(7) information.

Upon receiving the query that associated or embedded with the querier criteria C', the information store 405 matches the querier criteria C' against all the recipient criteria C available locally and/or externally. The information store 405 then sends the querier node 407 any matched recipient criteria C for the node 407 in a process 419. By way of example, matched recipient criteria C include "female fans of Dave Stewart age 18-24", "fans of Dave Stewart who downloaded online Sweet Dreams", "people who attended Dave Stewart's 2008 concert in London", etc.

In one embodiment, the query is embedded with the querier criteria C', the information store 405 can match the querier criteria C' against all the recipient criteria C directly. In another embodiment, the query is associated with the querier criteria C' (e.g., by the user name Jenna), the information store 405 can search within its own database and/or external databases for other information of Jenna such as the above-mentioned (1)-(7) information, in order to extract the querier criteria C' of Jenna. The information store 405 then can match the extracted querier criteria C' of Jenna against all the available recipient criteria C. All the information can be stored in the formats of RFG graphs, ROBDD, hash IDs, keyed hash IDs, to reduce storage space and/or accelerate the marching speed at different degrees based upon a selected format.

As mentioned, in the process 415, the sender node 403 has an option to send to the information store 405 a message including the recipient criteria together with a header that describes or otherwise specifies the recipient criteria. When the recipient criteria are sent in a message without a header, the querier node 407 may read the recipient criteria transmitted through a logically separate message that makes the recipient criteria visible, i.e., not being encrypted. The querier node 407 then determines whether to decrypt C before trying to decrypt C. After reviewing all of the matched recipient criteria C from the information store 405 as displayed on an user interface, the querier node 407 selects one or more of the matched recipient criteria C (e.g., females fans of Dave Stewart age 18-24), and sends to the PKG 401a request for a decryption key to decrypt the selected recipient criteria C in a process 421.

Upon receiving the request for the decryption key for the selected recipient criteria C, the PKG verifies whether the querier node 407 satisfies the selected recipient criteria C (i.e., females fans of Dave Stewart age 18-24) by check locally for the node 407's access rights, or outsourcing to the information store 405 for verification in a process 423. In one embodiment, the PKG verifies the querier criteria by checking one or more access rights of the querier. In another embodiment, the PKG verifies the querier criteria by comparing or initiating comparison of the querier criteria with relevant querier criteria available locally or externally (e.g., in the information store 405). The relevant querier criteria involving an online or offline public record (e.g., a birth certificate, school record, driver's license, tax record, real property record, criminal records, etc.), transaction (e.g., flight tickets, movie tickets, CD/DVD/book purchases, restaurant/store/hospital/gym visits, car/house/education loans, credit debts, phone/utility/heating bills, internet browsing behaviors, etc.), activity (e.g., basketball team, hike, concert, etc.), visit (e.g., a hospital, gum, park, restaurant, museum, etc.), interaction (e.g., blog, discussion forum, social network profile, online gaming, virtual life via an avatar, etc.), communication content item (e.g., email, SMS, MMS, call, media conference, etc.), membership (e.g., golf club, airline frequent flyer, speaker bureau, etc.), or a combination thereof.

Once the querier node 407 is verified as satisfying the selected recipient criteria C, the PKG 401 sends a decryption key corresponding to the selected recipient criteria C to the node 407 in a process 425.

In yet another embodiment, the processes 421, 423, and 425 are performed by the information store 405 that can perform relevant functions of the PKG 401. In the case, the information store 405 and the PKG 401 can merge as one. In yet another embodiment, the information store 405 even assumes PKG 401's function of distributing to all entities the common parameters. In the case, the information store 405 fully replaces the PKG 401.

An encrypted packet by a sender and a query by a querier are used differently. By way of example, for an urgent product order, a user has no time to publish the order and wait for targeted recipients to contact the user like a typical sender (e.g., the node 403). In this case, the user should send a query to one or more information stores and ask the stores to match the query against existing encrypted secret data to find a match. This embodiment offers one option for a querier to locate queried content quickly.

When querying the information store for content, the querier may select to keep the confidentiality of the querier's actual identification. By way of example, a business intelligence analyst does not wish to link the query with the company that the analyst is working for, to prevent any competitors to get any hint of the company's future plans.

An encrypted packet by a sender and a query by a querier are used differently. By way of example, for an urgent product order, a user has no time to publish the order and wait for targeted recipients to contact the user like a typical sender (e.g., the node 403). In this case, the user can include in the same encrypted packet encrypt instructions to information stores to execute matching against existing and/or incoming encrypted packets locally and/or externally.

Alternatively, the querier node 407 can skip encrypting a packet, send only a query to one or more information stores, and ask the stores to match the query against existing encrypted secret data to find a match. The querier may also send a persist query to the information stores and ask the stores to continue matching the query against existing and incoming encrypted secret data until finding a match or even continuing after finding a match. Another example process used in the approach of system 100 is described in more detail with respect to FIG. 5 below.

Figure 5:
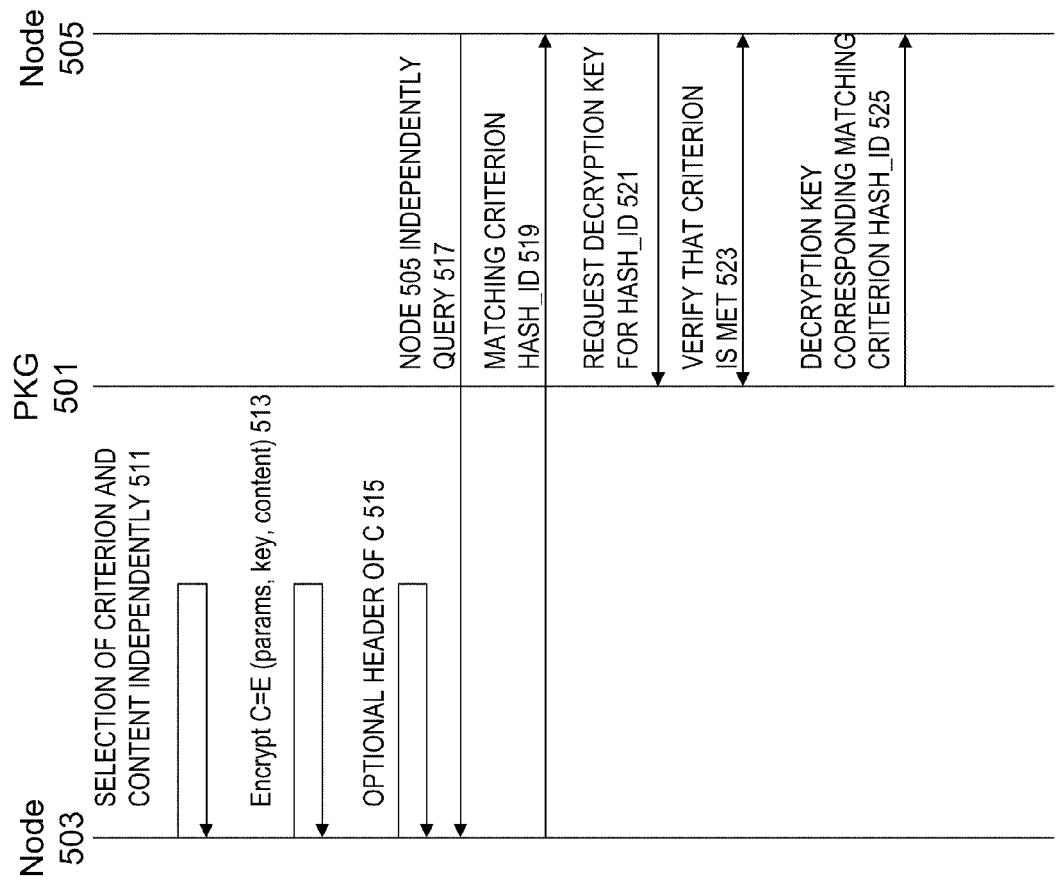
FIG. 5 is an operational diagram for content encryption in a peer-to-peer (P2P) architecture, according to one embodiment.

FIG. 5 is an operational diagram for content encryption in a peer-to-peer (P2P) architecture, according to one embodiment. In particular, the information store is absent from FIG. 5. In an anonymous P2P communication system, the nodes are anonymous or pseudonymous (e.g., using false names, alias names, etc). By way of example, every node in the system 100 acts as a sender and a querier to maintain anonymity. It is difficult, if not impossible, to determine whether a node that sends a message was the one originated the message or simply forwards the message on behalf of another node. Anonymity of the nodes is also achieved by special routing overlay networks that hide the physical location of each node from other nodes. The system 100 further strengthens anonymity of the nodes with recipient criteria in identity-based encryption according to the above-described embodiments.

In the P2P architecture of FIG. 5, a sender node 503 executes a process 511 of independently selecting one or more recipient criteria and secret data, a process 513 of encrypting the secret data using the recipient criteria, and a process 515 of optionally sending to a querier node 505 a message including the recipient criteria together with a header. The processes 511, 513, 515 are executed in similar manners as the processes 411, 413, 415 in FIG. 4.

Instead of contacting the cloud of an information store as in FIG. 4, the querier node 505 contacts the sender node 503 to send a query for content data (i.e., the user's favorite song of Dave Stewart) in a process 517. Upon receiving the query that is associated or embedded with the querier criteria C', the sender node 503 matches the querier criteria C' against all the recipient criteria C stored locally and/or externally. The sender node 503 sends the querier node 505 any matched recipient criteria C in a process 519. The matched recipient criteria C may include, for instance, criteria such as "female fans of Dave Stewart age 18-24", "fans of Dave Stewart downloaded online Sweet Dreams", "people attended Dave Stewart's 2008 concert in London", etc.)

Thereafter, the querier node 505 interacts with the PKG 501 in FIG. 5 via processes 521, 523, 525 that are the same as the processes 421, 423, 425 of FIG. 4. The querier node 505 selects one or more of the matched recipient criteria C, and sends to the PKG 501a request for a decryption key to decrypt the selected recipient criteria C in the process 521. Upon receiving the request for the decryption key, the PKG 501 verifies the querier node 505 in the process 523. Once the querier node 505 is verified as satisfying the selected recipient criteria C, the PKG 501 sends a decryption key corresponding to the selected recipient criteria C to the querier node 505 in the process 525.

In another embodiment, the sender node 503 and the query node 505 delegate computation tasks to one or more information stores, use the storage of the information stores as primary or back-up storage, etc. By way of example, the nodes use the computer resources (including software applications and hardware equipment, etc.) and/or IT services of multiple information stores of various service providers to conduct cloud computing by virtualizing the internet resources on an user interface of the nodes so that the nodes can dynamically ("on-demand") deploy scalable internet resources. In this case, the nodes request a service (resource), not a specific server (of an information store or a service provider). Cloud computing reduces software and/or hardware expenditures by the nodes. The nodes only need to pay the information stores on a utilization basis.

Figure 6:
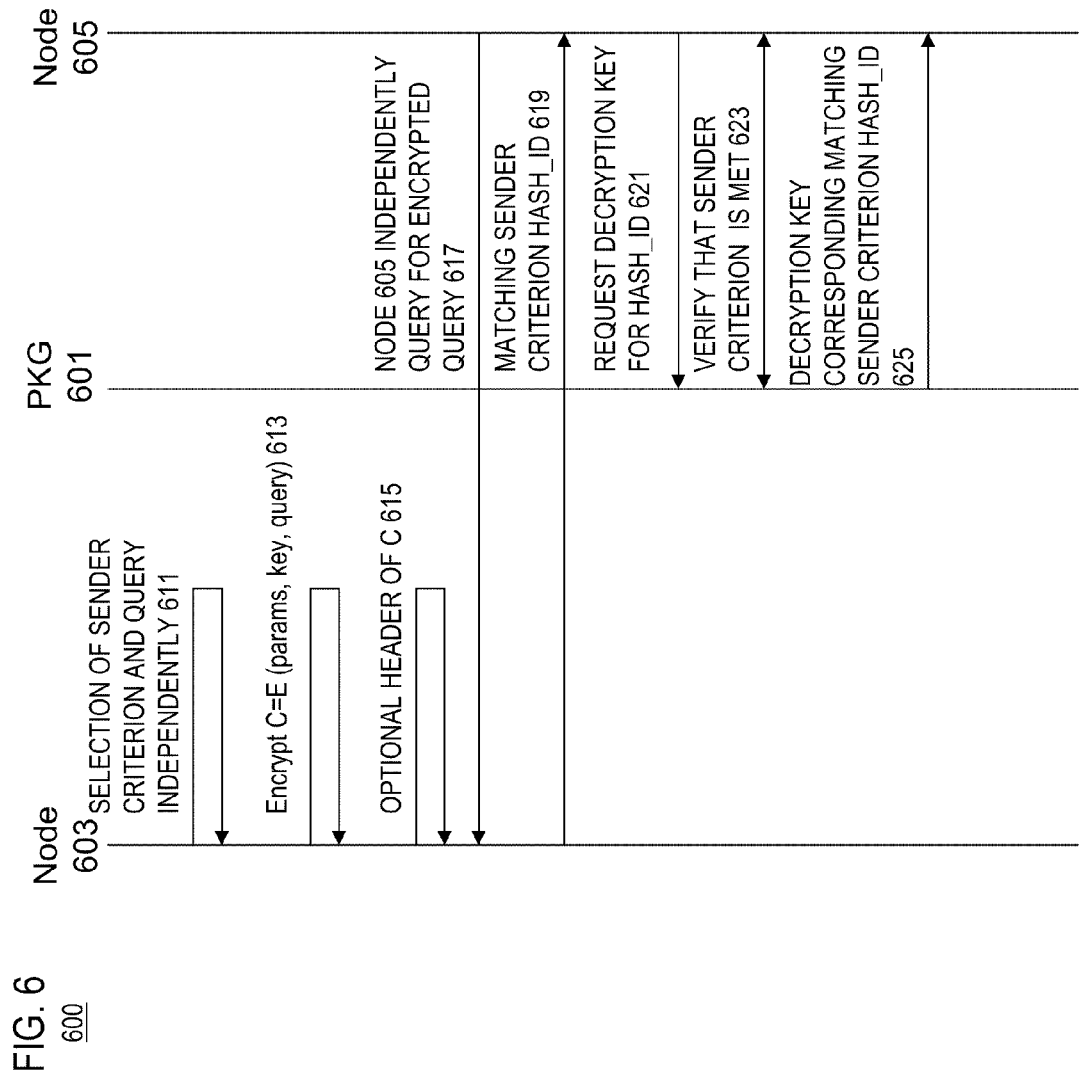
FIG. 6 is an operational diagram for query encryption in a peer-to-peer (P2P) architecture, according to one embodiment.

However, once anonymous networks extend outside of small and friendly user communities, these networks are susceptible to spam attacks launched by malicious users. Such attacks require different solutions in the anonymous networks, such as an anonymous sender verification mechanism. FIG. 6 is an operational diagram for query encryption in a peer-to-peer (P2P) architecture, according to one embodiment. To avoid compromising the anonymity of queries in the P2P architecture, the system 100 uses one or more sender criteria Cs (e.g., fans of Dave Stewart) as a public key to encrypt a query. Thereafter, the PKG 601 verifies whether a sender satisfies the sender criteria Cs (set by the querier node). The PKG 601 provides a decryption key to the sender node to decrypt the encrypted query only if the sender node satisfies the sender criteria Cs. The system 100 provides a verification means for a secret data sender to verify recipients such that only intended recipients can decrypt the encrypted secret data. The system 100 also provides a reverse verification means for a querier to verify the secret data senders such that only intended senders can decrypt the encrypted queries.

In the P2P architecture of FIG. 6, a querier node 603 executes a process 611 of independently selecting one or more sender criteria and query data, a process 613 of encrypting the query data using the sender criteria, and a process 615 of optionally sending to a sender node 605 a message including the sender criteria together with a header. The processes 611, 613, 615 are executed in similar manners as the processes 511, 513, 515 in FIG. 5.

Instead of directly receiving the query (i.e., songs of Dave Stewart) as in FIG. 5, the sender node 605 is may send to the querier node 603 a query for an IBE-encrypted query (that was IBE encrypted with sender criteria Cs) in a process 617. As mentioned, the sender criteria Cs are set by the querier to screen only senders satisfying the sender criteria Cs to decrypt the encrypted query. Upon receiving the query for an encrypted query, the querier node 603 matches sender criteria Cs (e.g., a Canadian Better Business Bureau certified "A" information store) that are sent from the sender node 605, against all the sender criteria Cs' (e.g., a US Better Business Bureau certified "A" information store) stored locally and/or externally. The querier node 603 sends to the sender node 605 any matched sender criteria Cs' in a process 619.

Thereafter, the sender node 605 interacts with the PKG 601 in FIG. 6 via processes 621, 623, 625 that are the same as the processes 521, 523, 525 of FIG. 5. The sender node 605 selects one or more of the matched sender criteria Cs', and sends to the PKG 601a request for a decryption key to decrypt the selected sender criteria Cs' in the process 621. Upon receiving the request for the decryption key, the PKG 601 verifies the sender node 605 in the process 623. Once the sender node 605 is verified as actually satisfying the selected sender criteria Cs' (e.g., a US Better Business Bureau certified "A" information store), the PKG 601 sends a decryption key corresponding to the selected sender criteria Cs' to the sender node 605 in the process 625.

Figure 7:
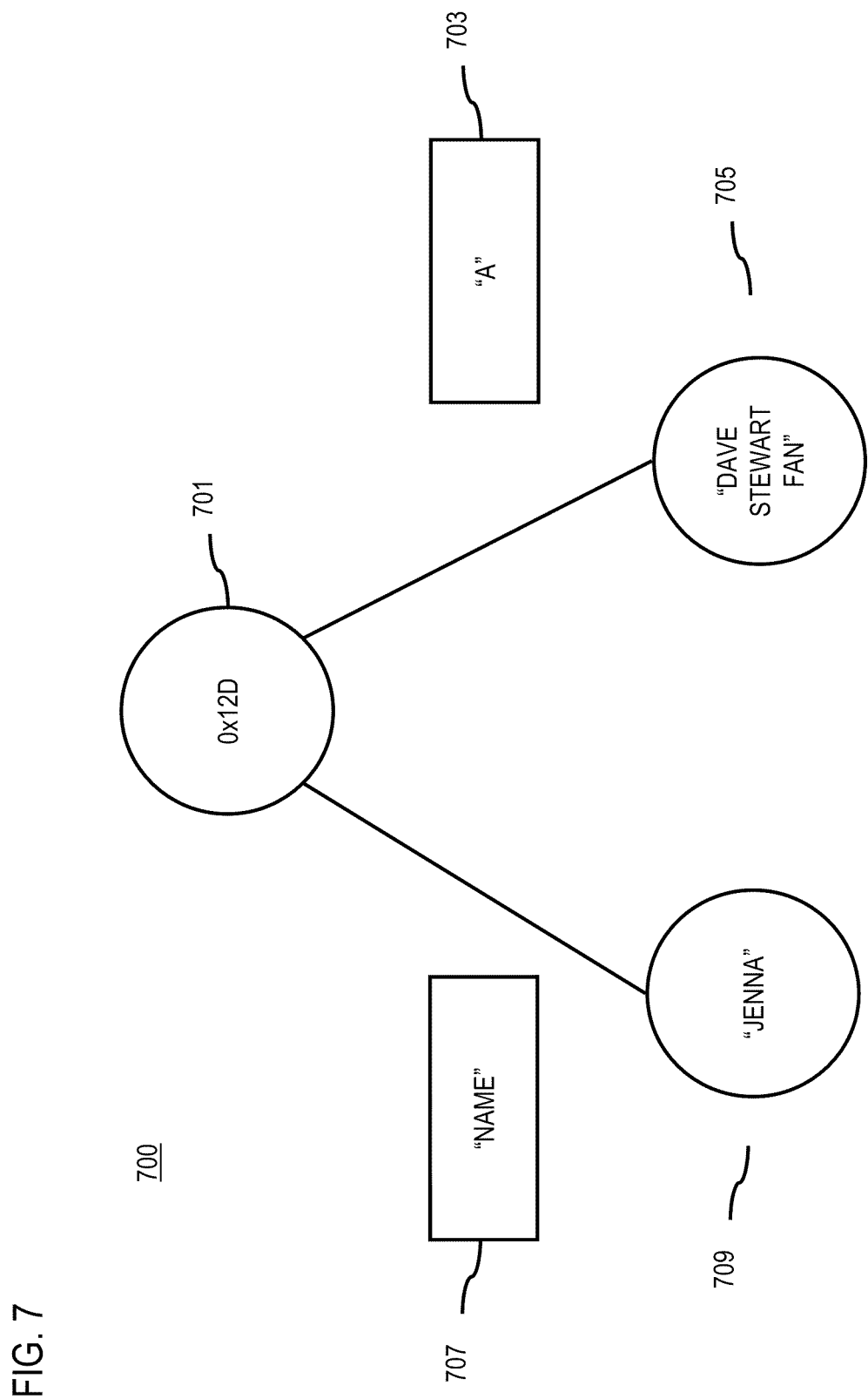
FIG. 7 depicts an instance of a simple RDF graph, according to one embodiment.
Figure 8B:
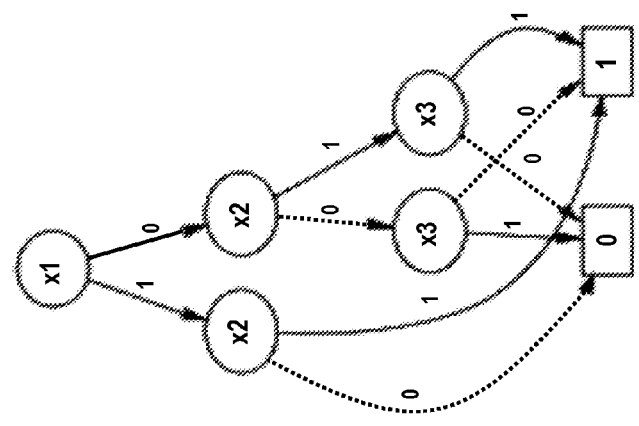
FIGS. 8A-8B are example diagrams of a binary decision diagram and a corresponding reduced ordered binary decision diagram.
Figure 8A:
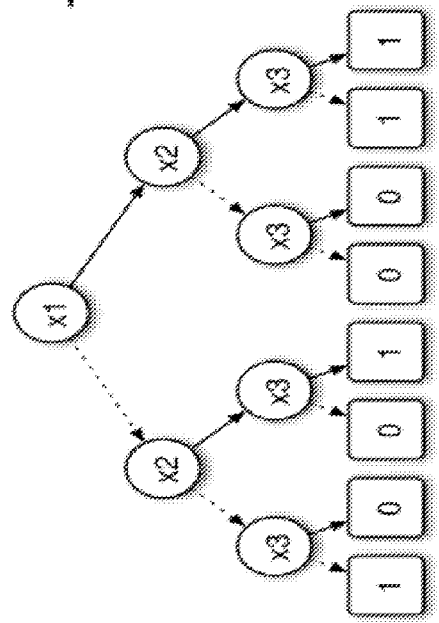

The processes of FIGS. 3-6 are further discussed with respect to FIG. 7 and FIGS. 8A and 8B which depict example RDF graphs that can be used in the IBE encryption process. In one embodiment, the criterion application 107a formats each of the recipient, querier, and sender criteria and each of the queries into a predetermined information representation format or structure (e.g., a RDF graph).

FIG. 7 depicts an instance of a simple RDF graph, according to one embodiment. In this example, a RDF graph 700 representing one of the querier criteria, i.e., "Jenna is a Dave Stewart fan," which is represented by the following two triples in Table 1:

TABLE 1

0x12D, a, Dave Stewart fan
0x12D, name, "Jenna"

The RDF graph includes an instance 701, "0x12D," is "a" (e.g., an RDF process 703) "Dave Stewart fan" (e.g., an RDF node 705) and has a "name" (e.g., an RDF process 707) of "Jenna" (e.g., an RDF node 709)." To simplify the discussion, there are only two vertices extending from instance 701 "0x12D" and there is no subtree below the RDF node 705 "Dave Stewart fan" or the RDF node 709 "Jenna." However, it is contemplated that there can be any number of vertices and/or subtrees below any of the RDF nodes (e.g., nodes 625 or 629) of the RDF graph 700, to represent the information of age 18-24, and attended Dave Stewart concerts, etc., as part of querier criterion RDF. FIG. 8A is a diagram of a more complicated RDF graph, and FIG. 8B is a diagram of a reduced ordered binary decision diagram corresponding to the RDF graph of FIG. 8A.

Figure 3:
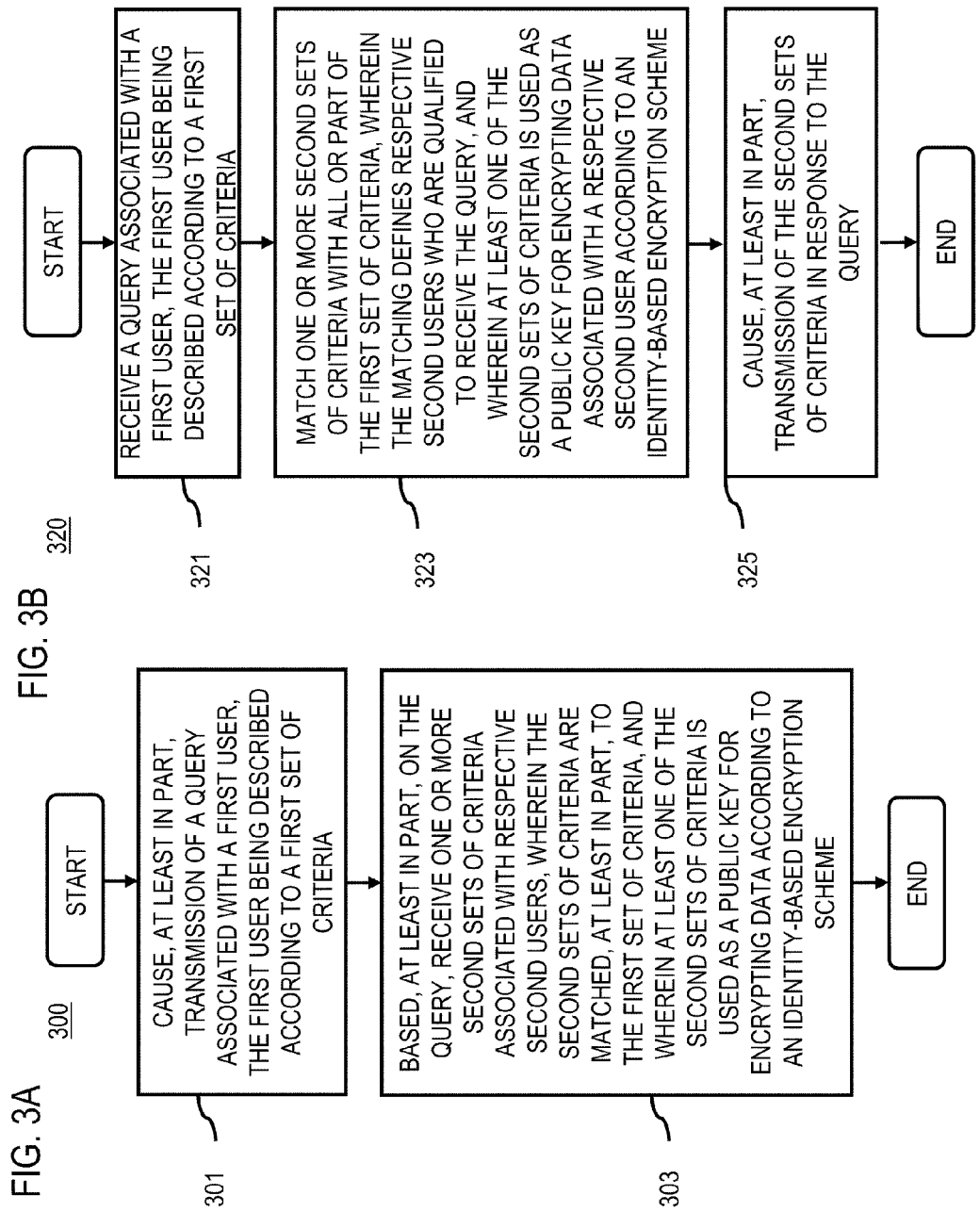
FIGS. 3A-3B are flowcharts of processes for querying content protected by identity-based encryption, according to various embodiments.

Returning to the process 300 of FIG. 3, the criterion application 107a constructs the ROBDD 820 of FIG. 8B from the RDF graph 800 of FIG. 8A representing the querier criteria. In particular, the criterion application 107a serializes the RDF graph 800 into variables of a predetermined format to construct the ROBDD 820. There are many ways or conditions for encoding the RDF graph 800 into bit vectors. For instance, the bit size can be three as discussed below. Different bit sizes result in, for instance, different numbers of variables which lead to ROBDD graphs of different sizes and shapes. ROBDD is essentially a group of Boolean variables in a specific order and a directed acyclic graph over the variables. In the example of FIG. 7, the criterion application 107a sets five BDD variables representing the subject (e.g., the instance 701 "0x12D"), the predicates (e.g., process 703 "a" and process 707 ", name") and the objects (e.g., node 705 "Dave Stewart fan" and node 709, "Jenna"). The criterion application 107a then selects a number of bits for representing and encoding the subject, the predicates, and the objects. Accordingly, the criterion application 107a encodes these variables in three bits and saves the encoding information in a dictionary as follows in Table 2:

TABLE 2

| 0x12D | <=> 101 |
| a | <=> 001 |
| Dave Stewart fan | <=> 011 |
| name | <=> 010 |
| Jenna | <=> 100 |

The criterion application 107a constructs a ROBDD 820 from the variables. With respect to the example of FIG. 7, the criterion application 107a uses the encoded variables to create a ROBDD graph consisting of nine one-bit variables, where the first three variables are interpreted as a variable encoding the first field of the triple, the second three variables are interpreted as a variable encoding the second field, and the last three variables are interpreted as a variable encoding the third field of the triple. This ROBDD 820 is unique for the chosen triples and variable ordering, resulting in representation of the following encoded triples in Table 3:

TABLE 3

101 001 011
101 010 100

Thereafter, in one embodiment, the criterion application 107a matches the querier criteria corresponding to the query against one or more recipient criteria each used as a public key of identity-based encryption on secret data. Similar encoding processing for recipient criteria has already been performed such that the querier criteria and the recipient criteria can be matched in the same format.

The criterion application 107a then causes, at last in part, storage the ROBDD of the querier criteria. Since the ROBDD 820 is smaller than the RDF graph 800, this embodiment provides a means for reducing the storage and network traffic for sending recipient and querier criteria related information.

In another embodiment, the criterion application 107a computes a hash identifier corresponding to the ROBDD 820 of the querier criteria, thereby matching the querier criteria against the recipient criteria in the hash id format. The criterion application 107a then causes, at last in part, storage of the hash identifier of the querier criteria. Since the hash identifier is shorter than the ROBDD 820, this embodiment provides a means for further reducing the storage and network traffic for sending querier criteria related information.

To compute the hash identifier of the ROBDD 802, the criterion application 107a selects a hash function for obtaining unique hash identifiers within the system 100, and feeds the representation into the hash function. Like the size of the bit encoding, the hash function is usually chosen heuristically or to be adhered to by all users and/or components of the system 100. Optionally, the criterion application 107a shortens the computed hash identifier by truncating a result of the hash function while obtaining unique hash identifiers. The criterion application 107a then stores the hash identifier with the ROBDD 820, before publishing the hash identifier of the recipient criteria.

As discussed, there are different advantages of sending to the information store the message including the recipient criteria with or without a header describing the recipient criteria. In another embodiment, by using a header that contains some derivative of the recipient criteria, such as the hash identifier or the keyed hash identifier of the recipient criteria, the problem of spam attacks are prevented while the information of the recipient criteria is made available for the information store and/or intended recipients. To obtain the ROBDD 820 or the RDF 800 from the hash identifier or the keyed hash identifier, the information store and/or the intended recipients may compare incoming derivative of the potential recipient criteria with the derivatives in a database to identify the corresponding ROBDD 820 or RDF 800. Alternatively, the information store. Alternatively, the intended recipients may reconstruct the ROBDD 820 or RDF 800 via a reverse computation as discussed above in conjunction with the construction history of the ROBDD 820 or RDF 800 in the database. When the derivative of the recipient criteria is a keyed hash identifier, the key used to encrypt the hash identifier is identified by the key ID, and then used to decrypt the keyed hash identifier.

Similar encoding processing for the encrypted secret data and/or the query is performed such that they can be selectively transmitted, received, stored and published more efficiently.

Optionally, the encrypted hash identifier of the secret data and query can be further encrypted with a key following a similar process for creating a keyed hash identifier of the secret data and query, to provide one additional layer of protection. The encrypted ROBDD, hash identifier, or keyed hash identifier of the secret data can be published in the semantic web with the hash identifier or keyed hash identifier of the recipient criteria that is used to encrypt the encrypted decision diagram, hash identifier, or keyed hash identifier of the secret data. The above-discussed sets of keys, key IDs, and the encrypted targets can be stored at the PKG, nodes, the information store for marching the corroding ROBDDs or RDF graphs without transmitting them over the communication network. In addition, if these entities also store the construction histories of the ROBDDs or RDF graphs, they can reconstruct a ROBDD or RDF graph locally based on a hash identifier or a keyed hash identifier, when the ROBDD or RDF graph is not stored locally.

Figure 9:
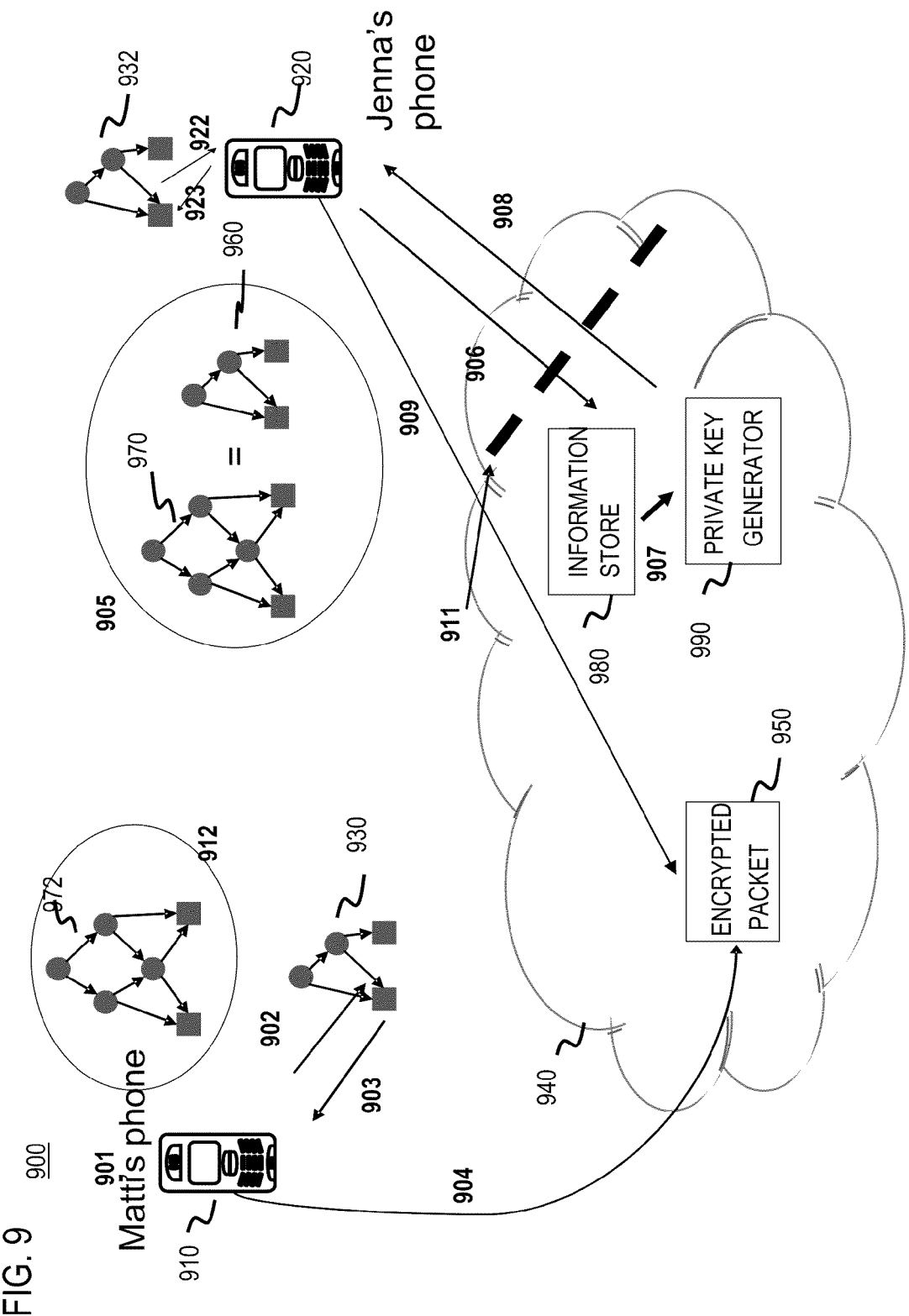
FIG. 9 is an utilization diagram of the process of FIG. 3, according to one embodiment.

FIG. 9 is utilization diagram of the process of FIG. 3, according to one embodiment. Considering a situation shown in FIG. 9, one user (e.g., Matti) wants to shares secret data with participants (e.g., Jenna) in a social network meeting one or more criteria via their mobile terminals 910, 920. By way of example, the users may participate in the data or information sharing via personal computers or other kinds of devices or equipment as described with respect to the UE 101 above. In operation 901, Matti sets recipient criteria for his secret data, for example, as women of 18-24 years old, downloaded songs of Dave Stewart, and optionally certified by a service provider as a basic level or an extreme level. By way of example, Matti expresses the recipient criteria, i.e., a privacy policy to select the participants of the group to which he targets the secret, as follows in Table 4:

TABLE 4

:c
    :download "Dave Stewart"
    :age "18-24"
    :sex "female"
    :sp_certified "Basic|Extreme"    # optional The criterion application 107a within Matti's phone 910 constructs a RDF graph containing the recipient criteria, and converts the RDF graph into a ROBDD 930 during an operation 902. The criterion application 107a also computes a hash identifier for the ROBDD 930 via AugBDD_id C_ID=AugBDD(:c) during an operation 903. Matti sets his secret data to include, for example, a Dave Stewart fan club account number and fan club postal office mail box for fans to denote money to buy two albums "Sweet Dreams" and "One of the boys" or to directly denote the two albums. The secret data optionally contains the fan club account name and password assigned by a service provider. By way of example, Matti sets the secret data, which Matti wants to share with people who can demonstrate to fulfill the recipient criteria, as follows in Table 5:

TABLE 5

:s
    :fan_club_bank_account "10000"
    :fan_club_pobox "10615"
    :fan_bulletin_board "Donate Dave Stewart albums to disabled kids"
    :album_name "Sweet Dreams"
    :album_name "One of the boys"
    :sp_account_name "davefan1"    # optional
    :sp_account_passwd "davedave"    # optional The criterion application 107a then converts the secret data into a ROBDD, generates a hash identifier via S_ID=AugBDD(:s). A set of IBE common domain parameters (e.g., common_pars) as discussed is obtained from a centralized source. The criterion application 107a encrypts the secret data using the hash identifier as a public key via Msg=IBE_crypt(common_pars, C_ID,S_ID). The criterion application 107a publishes in the cloud 940 the hash identifier and a packet/message 950 containing the encrypted secret data in a format of E_hash_id(data) during an operation 904.

Instead of the cloud 940, the criterion application 107a inserts the hash identifier of the recipient criteria and the packet into a smart space (discussed later) as common data via Insert (:Matti, :SP_IBE_content,(msg,C_ID)).

When Jenna, an 18 years old female indicates via her phone 920 that she wants to download one or more songs of Dave Stewart from an information store in the cloud 940, the criterion application 107a within Jenna's phone 920 updates Jenna's old ROBDD 960 into a ROBDD 970 with information of the downloaded songs as querier criteria C' and coverts the new ROBDD 970 into a hash identifier during an operation 905. By way of example, Jenna's querier criteria, i.e., background information, are expressed as follows in Table 6:

TABLE 6

:c'
    :download "Dave Stewart"
    :age "18"
    :sex "female"

The criterion application 107a then sends the query (e.g., for songs of Dave Stewart) to the cloud 940 during an operation 906. Optionally, all or part of Jenna's criteria is sent to the cloud 940 for verification that Jenna actually meets the specified criteria. The cloud 940 may use the hash identifiers of Jenna's criteria and/or the encrypted query for fast processing.

An information store 980 in the cloud 940 matches Jenna's new ROBDD 970 corresponding to the querier criteria with the ROBDD 930 corresponding to the Matti's hash identifier of the recipient criteria as well as other recipient criteria available internally and/or externally, and then notifies a PKG 990 any positive matching results during an operation 907. Alternatively, the information store 980 matches their corresponding hash IDs to speed up the process. The PKG 990 then finds the private/decryption key(s) corresponding to any matched recipient criteria (including Matti's), and sends the decryption key(s) to Jenna during an operation 908.

The criterion application 107a within Jenna's phone 920 then can use the decryption key to decrypt the packet/message 950 containing the encrypted secret data during an operation 909.

Before decrypting the packet, Jenna's criterion application 107a checks the header of the packet for the recipient criteria to determine if it is something that might interest her. For example, the determination can be made automatically based upon Jenna's preference data stored in the phone 920, or made by displaying the matched recipient criteria to Jenna to prompt her to indicate her interest. If the header contains a hash identifier of the recipient criteria, the criterion application 107a searches locally for a matched ROBDD then determines based upon the ROBDD. The social network has friendship relations and public information of its participants. These relations and information are formed into RDF graphs, which can be constructed as AugBDDs and published at a central location or any information store in the cloud 940. The AugBDDs may contain history information of its construction. An ROBDD encoding dictionary/database may be available for all participants. If necessary, the dictionary is transmitted along with the ROBDDs or the AugBDDs to a participant.

If there is no matched ROBDD stored locally, the criterion application 107a within Jenna's phone 920 can reconstruct the ROBDD based upon the construction history of the ROBDD, or ask for the ROBDD from the information store 980. If the header contains a keyed hash identifier of the recipient criteria, the criterion application 107a finds the key used to encrypt the hash identifier of the recipient criteria either locally or from the information store 980, decrypts the keyed hash identifier with the key, and then proceeds to find the corresponding ROBDD of the recipient criteria as discussed.

Optionally, the cloud 940 enforces configuration validity check between a node (e.g., Jenna's phone 920) and the PKG 990 during an operation 911. For example, the cloud 940 checks the hash identifier of Jenna's ROBDD and the privacy key to ensure that their configurations are within acceptable or predetermined ranges.

In a P2P architecture, Matti and Jenna are in control of the functions of the information store 980 or even the functions of the PKG 990. Therefore, the information store 980 and/or the PKG 990 become absent from FIG. 9. The cloud 940 can be used by Matti and Jenna for cloud computing so as to reduce hardware and software expenditures of Matti and Jenna.

To screen senders and avoid spam in P2P architecture, the criterion application 107a within Jenna's phone 920 sets sender criteria (e.g., high consumer/peer rating), and IBE-encrypts Jenna's query with the sender criteria, to ensure only senders satisfying the sender criteria can decrypt Jenna's query. By way of example, the sender criteria, i.e., background information, are expressed as follows in Table 7:

TABLE 7 cs
: support downloading "Dave Stewart"
: peer/consumer review "no outstanding complaint"
: responsiveness "within one hour"

The criterion application 107a within Jenna's phone 920 constructs a RDF graph containing sender criteria (e.g., high consumer/peer rating), and converts the RDF graph into a ROBDD 932 during an operation 922. The criterion application 107a also computes a hash identifier for the ROBDD 932 via AugBDD_id Cs_ID=AugBDD(:cs) during an operation 923. The sender criteria is set to screen only senders satisfying these criteria such that only they can decrypt the encrypted query and then interact with Jenna. In another embodiment, the sender criteria are applied to an information store (inside or outside of P2P architecture).

The criterion application 107a within Jenna's phone 920 also checks the hash identifier of Matti's criteria against government records (e.g., class actions) and/or consumer complaint records, etc, to ensure that Matti actually satisfies the sender criteria and the sender is actually Matti. This is a crucial function to maintain the integrity of the system 100.

Thereafter, the criterion application 107a within Jenna's phone 920 matches Matti's ROBDD 972 with the ROBDD corresponding to Matti's hash identifier of sender criteria in an operation 912, and then notifies a PKG 990 of any positive matching results during another operation 907. Alternatively, the criterion application 107a matches their corresponding hash IDs to speed up the process. The PKG 990 then finds the decryption key corresponding to Matti's hash identifier of the sender criteria, and sends the decryption key to Matti during another operation 908. With the decryption key, the criterion application 107a within Matti's phone 920 can decrypt Jenna's encrypted query or any other queries encrypted with the same sender's criteria.

Figure 10:
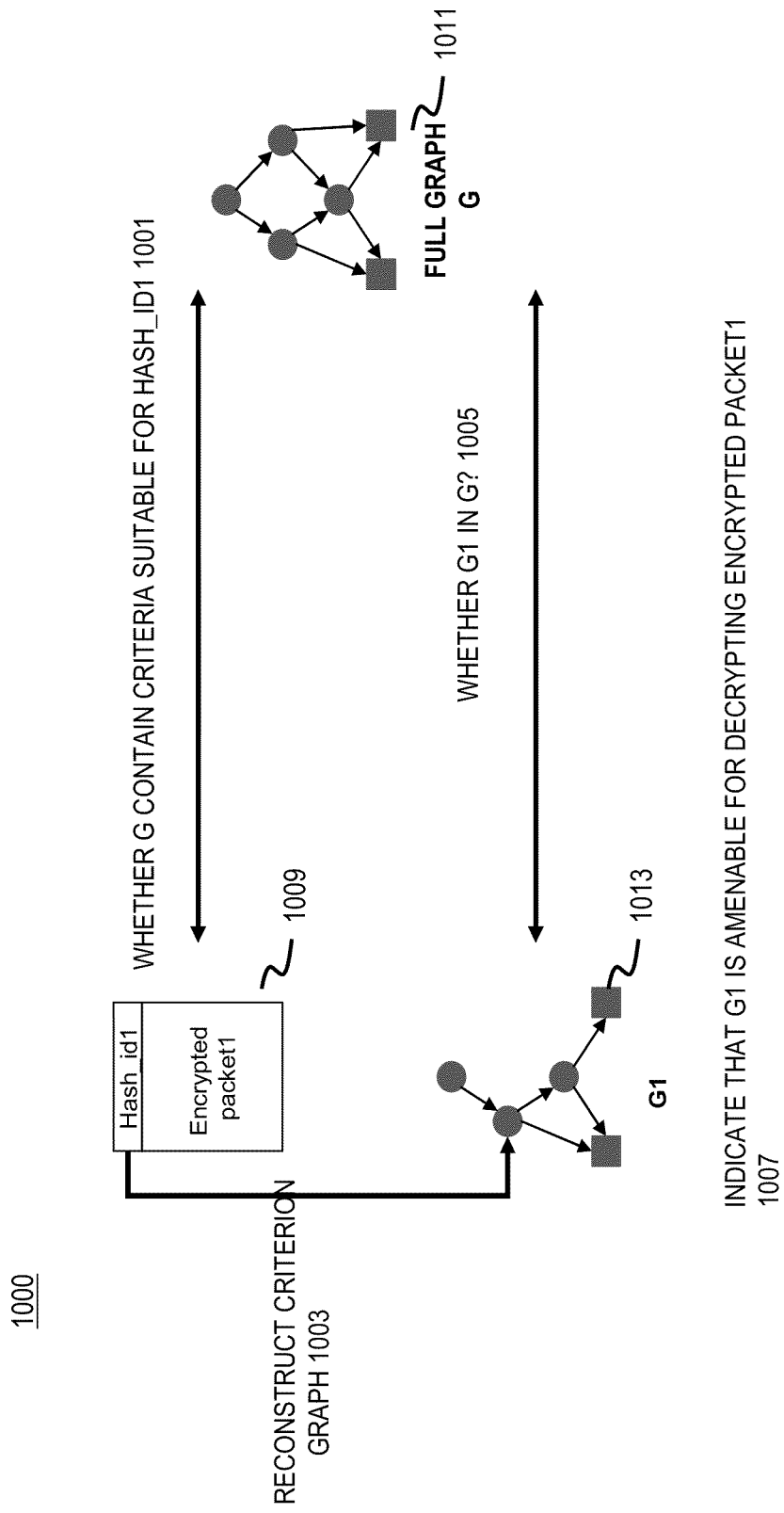
FIG. 10 a conceptual diagram of matching different sets of criteria, according to one embodiment.

FIG. 10 a conceptual diagram of matching different sets of criteria, according to one embodiment. To search for IBE encrypted content, the information store or cloud matches, for instance, an RDF graph (G) 1011 of the querier criteria against available recipient criteria. The comparison can be conducted at the RDF graph level, the ROBDD level, the hash-ID level, or the keyed hash-ID level, depending upon the format of the querier criteria C' and the format the recipient criteria C. As discussed, the shorter the format is, the less communication bandwidth and storage space it takes. In addition, the shorter the format is, the quicker the comparison can be done.

By way of example, the full ROBDD G of the querier criteria C' or its sub-graphs (each of which partially correspond to the querier criteria C') are processed by the information store. The information store stores all pairs of hash_ids and related encrypted packets. The information store computes a hash ID for the querier criteria C' (i.e., hash_id2) from the full ROBDD G. The information store compares hash_id2 against hash_id1 of the recipient criteria C (that is stored with the encrypted packet 1009), to determine whether G contains criteria suitable for hash_id1 in a Step 1001. The Step 1001 is repeated for each hash ID of recipient criteria C stored in the information store.

When hash_id1 and hash_id2 are not identical, the information store reconstructs a ROBDD (G1) 1013 partially corresponding to the recipient criteria C in Step 1003, by using the construction history and hash_id1. In Step 1005, the information store checks whether G1 is a subgraph of G. This is done efficiently when G1 and G both are in AugBDD format.

When G1 is determined as a subgraph of G in Step 1007, G1 is amendable and sufficient for decrypting the encrypted secret packet. The information store may send to the querier (e.g., Jenna): (1) the hash_id1 and the encrypted packet, (2) only the hash_id1, or (3) only the encrypted packet.

When receiving the matched hash_id1 (i.e., the same as hash_id2) and the encrypted packet, the querier uses the hash_id1 to request for a decryption key from the PKG, and decrypts the encrypted packet with the decryption key. In addition, the querier saves the hash_id1 and the encrypted packet in its own AugBDD database for future reference. Optionally, the querier saves the decryption key and the decrypted packet in its own database for future information.

When receiving only the hash_id1, the querier fetches the encrypted packet in the cloud by itself, and contacts the PKG for a decryption key to decrypt the encrypted packet. It is possible that the querier has already received the encrypted packet via other means. By way of example, the querier (e.g., Jenna) has already received a message from a record store, where the querier bought the album of Dave Stewart, which includes the encrypted packet. It is also possible that the querier possesses a full ROBDD of the secret data such that the querier does not have to decrypt the encrypted packet. In this case, the querier only needs to search within its own AugBDD database to see if there is any full ROBDD G corresponding to the hash_id1. By way of example, the querier already received a message from a fan club of Dave Stewart. The fan club pre-screened members according to the recipient criteria C corresponding to hash_id1 and sent out the message with secret data in a ROBDD format (without being encrypted with the recipient criteria C).

When receiving only the encrypted packet, the querier looks into its own AugBDD database for a hash ID of its own querier criteria C' (i.e., hash_id2). Alternatively, the querier computes hash_id2 from its own ROBDD stored in its own AugBDD database. The querier then uses the hash_id2 to request for a decryption key from the PKG, and decrypts the encrypted packet with the decryption key.

The process of matching querier criteria against recipient criteria according to FIG. 10 can be applied to matching sender criteria set by a querier against sender criteria of senders to screen the senders.

Figure 11:
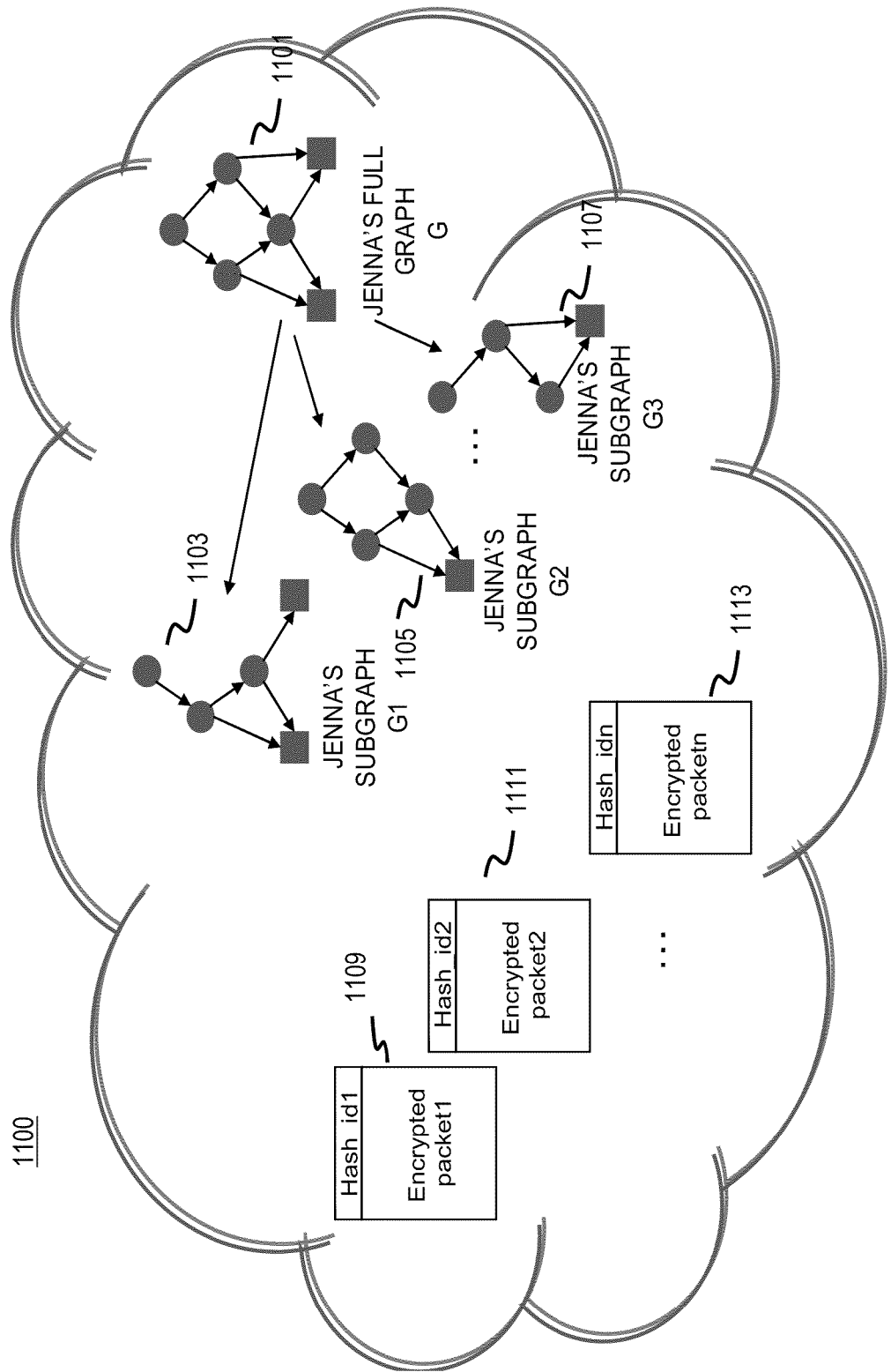
FIG. 11 a conceptual diagram of decomposing a RDF graph of recipient criteria, according to one embodiment.

FIG. 11 a conceptual diagram of decomposing a RDF graph of recipient criteria, according to one embodiment. To search for the IBE encrypted information in a finer granularity, the information store or cloud can decompose the full RDF graph (G) 1101 of the recipient criteria (e.g., females fans of Dave Stewart age 18 named Jenna) into different subgraphs G1/1103 (e.g., females fans of Dave Stewart), G2/1105, G3/1107 (e.g., named Jenna), etc. The smaller a subgraph is, the more likely to find a matched RDF graph of recipient criteria C. The information store or cloud then matches each of the subgraphs 1103, 1105, 1107 against each of the recipient criteria embedded in the encrypted packages 1109, 1111, 1113 based upon the process discussed in conjunction with FIG. 10. By analogy, any entities in the system 100 can decompose a full RDF graph of instruction criteria, querier criteria, sender criteria according to the process of FIG. 11 as does on the recipient criteria.

In one embodiment, the querier decomposes the full graph of the querier's background information graph and selects a sub-graph (i.e., a decomposed piece) as querier criteria for the query to send to the cloud. The cloud verifies the sub-graph of the querier against public or commercial records in the cloud to ensure that the querier actually satisfies the sub-graph. The cloud also checks if the querier is actually the entity as represented.

The querier may require the information store/cloud to keep the querier criteria confidential. The cloud implements an internal table which keeps track of the relationship between all of the different criteria and the associated encrypted content, and/or to keep the true identification of the sender and the querier confidential. The cloud then matches the sub-graph of the querier against all of the recipient criteria in the cloud based upon the process discussed in conjunction with FIG. 10. This provides a means to allow an entity in the system 100 to always find some matches based upon partial graphs.

The above described embodiments advantageously enhance outreaching and marketing efforts by providing an anonymous yet tailored messaging mechanism, thereby reducing network resources (e.g., computing resources, bandwidth, etc.) that would otherwise be required to individually identify potential recipients of the marketing efforts. The-above described embodiments also can be used by non-profit as well as for-profit entities to distribute any access-restricted information without knowing or specifying the identification of the recipients. By way of example, a natural disaster may potentially create orphans. A non-profit organization can then use the system 100 to send out messaging worldwide that is specifically targeted to solicit only those prospective adoptive parents that are forty-five or younger, married for at least two years and have no more than two previous marriages per spouse, without children or with children older than five, etc.

As another example, companies, that set goals to use, make, and sell "green products/services" in all aspects of their business operations, can use green recipient criteria to solicit for purchasing green products/services in order to manufacture green products or provide green services. By setting up the green recipient criteria, such as energy efficiency, reduced environmental impact, or ecological preservation, the companies can pre-screen suppliers/service providers (e.g., building maintenance contractors, business consultants, financial advisors, doctors, lawyers, tutors, etc.), customers (e.g., top 50 dental product manufacturers in China, tenants, etc.), employees, etc. with the required qualification and experience.

By encrypting the recipient criteria, the sender of the message keeps the confidentiality of the recipient criteria. By way of example, a pharmaceutical company wants to test the efficacy of Omalizumab, an approved drug for treating asthma, in patients with idiopathic anaphylaxis (recurrent hypersensitive allergic episodes for which a cause is not identified). The pharmaceutical company encrypts the eligibility criteria for medicine trial volunteers, so that their competitors have no access to such commercially valuable information. The eligibility criteria may include: age between 18 and 60 years, having been diagnosed with idiopathic anaphylaxis episodes (mild to severe) at least six times per year, at least once within the last 2 months, and emergency room visit, etc. The pharmaceutical company can also encrypt the recruiting criteria for clinical trial investigators and keep the clinical trial confidential since an earlier stage.

In another example, a marketing company encrypting the recipient criteria to look for participants of a focus group for a target such as an existing or new product, service, concept, advertisement, idea, packaging, price, etc., in order to find out the participants' perceptions, opinions, beliefs and attitudes towards the target. The above-described embodiments provide a means to keep the target and recipient criteria information confidential.

Besides commercial studies, the above-described embodiments can be used for non-profit studies, such as social sciences and urban planning, to allow interviewers to study by interviewing and observing behaviors of people in a group or one-on-one setting (online, teleconferencing, in person, etc.), and discover unexpected issues for exploration. The above-described embodiments provide means for the message sender to outreach to specific recipients without knowing their identities, which not only saves the sender's resources, time and money to research/assemble/purchase a tailored mailing list, but also encourages the public to participate in projects since the participants can remain anonymous.

The conventional participant recruiting scheme requires the sender to publicly post the recruiting criteria on media such as newspaper, sender's own website, job websites, professional association websites, clinical trial matching website, etc. For example, the US patent office sends out a general recruiting letter to all registered patent attorneys and agents to invite them to apply for a job as a patent examiner. If applying the above-described embodiments, the patent office can reach out to any target recipients with specified or predetermined education, technical training, industrial experience in special technology (that is a much big group than the group of registered patent practitioners) and indicating specific job descriptions (e.g., a US citizen or national, PhD in pharmacology, etc.) in each message that a particular recipient is actually qualified for. Such a customized marketing mechanism significantly reduces the number of messages, thus reducing the network traffic and extending equipment lifetime. Such a customized marketing means also spares non-qualified recipients from receiving messages they cannot act upon.

When querying the information store for content, the querier does not need to know the details of the content owners in order to find the targeted content. By way of example, if Jenna searches for a job in the field of business management, the search results can be too many to review and/or apply for. Even after adding additional search criteria such as city, years of experience, etc., the list may still be too long to review or to apply for one by one. A more efficient approach for Jenna is to contact the information store with the highlights of his resume, and instructs the information store to match her resume highlights against recipient criteria stored locally or externally (such as a company's recruiting webpage). The information store provides Jenna with a much more concise list of potential jobs. Jenna may not know and has never considered some of the jobs (such as a principal of a cook school, a manager of a funeral home, etc.) on the list.

The querier criteria and the recipient criteria are very flexible in terms of length and content, since they are not limited by any formats set in existing job search websites. Therefore, Jenna's resume highlights can be as creative as Jenna desires. Similarly, a job description by an employer can be as long as the employer wants without concerning the cost of publication length set by newspaper, websites, etc. The information store returns with a list of results and matching percentages, whether there is any 100% match.

The above-described embodiments provide a means to search beyond one or more specialty websites and provide more specialized and focused search results than the specialty websites. In the example, Jenna does not have to visit different job search websites yet obtain a comprehensive coverage beyond his perception and with literally unlimited depth.

These advantages are applicable to all kinds of content queries, whether in a context of business-to-business (B2B), business-to-government (B2G) business-to-consumer (B2C), consumer-to-consumer (C2C), or a combination thereof. In addition to business and e-commerce, these advantages are also applicable to other fields such as science, technology, finance, health, social network, travel, entertainment, etc. By way of example, for an urgent product order, a querier has no time to publish the order and wait for targeted recipients to contact the querier. In this case, the querier sends a persistent query to one or more information stores and ask the stores to continue matching the query against existing and incoming encrypted secret data until finding a match. In one example, the query may be for an order of 30 pieces of 50-gallon gas water heaters that comply with US safety standards and Washington D.C. building codes FOB DC ASAP to reach potential suppliers worldwide which have published and are going to publish their for sale list of gas water heaters. In another example, the query may search for ready-to-go catered food of Ahi Tuna, Wasabi and Black Sesame Tartare on a Won Ton Crisp & Gourmet Mini Sirloin Burgers made for a canceled 300 people corporate cocktail event.

While facilitating a message from a sender and a query from a querier, the information store provides means to keep the parties anonymous, maintain confidentiality of the recipient criteria and the querier criteria, and enable the sender and the querier to outreach parties worldwide to match with their criteria 24 hour/365 day per year. The information stores can charge fees for facilitating and brokering transactions. When a transaction involves more than one information store, one of the information stores can assume the role as a fee calculator, by identifying the participants to the transaction information chain, e.g., the buyer, the seller, and the brokers, and distribute the transaction proceeds from the buyer to the seller accordingly. The fee calculator also distributes fees to intermediary brokers that helped processing the sender message and/or the querier query. In another embodiment, the fee split scheme may follow the music industry models such as ASCAP (American Society of Composers, Authors and Publishers) and BMI (Broadcast Music Incorporated) to divide up the fees among all the information stores performing different functions of the transaction: publishing the message, verifying the querier, generating the decryption key, decrypting the encrypted secret data, etc.

The system 100 can be used in an information cloud, a semantic web, or a smart space architecture to be available in all locations to all nodes and entities. The goal of the semantic web is to define the meaning (semantics) of information and services on the web to be understandable and satisfying the web content searches by people and machines. As information on the Web grows, search engines routinely return thousands of results when, very often, only a handful truly qualify as meaningful for the query presented. The smart space truly achieves the goals of the semantic web and supports interpretability across different service provider, software and hardware platforms, user equipment, databases, etc.

As used herein, a smart space is interoperable over different information domains, different service platforms, and different devices and equipment. For example, the smart space accommodates transmission control protocol/Internet protocol (TCP/IP), Unified Protocol (UniPro) created by the Mobile Industry Processor Interface (MIPI) Alliance, Bluetooth protocol Radio Frequency Communication (RF-COMM), IPv6 over Low power Wireless Personal Area Networks (6LoWPAN), etc. The smart space also covers technologies used for discovering and using services, such as Bluetooth/human interface device (HID) services, web services, services certified by the Digital Living Network Alliance (DLNA), the Network on Terminal Architecture (NoTA). In addition, the smart space constitutes an infrastructure that enables scalable producer-consumer transactions for information, and supports multiparts, multidevices and multivendors (M3), via a common representation of a set of concepts within a domain and the relationships between those concepts, i.e. ontologies. The smart space as a logical architecture has no dependencies on any network architecture but it can be implemented on top of practically any connectivity solution. Since there is no specific service level architecture, the smart space has no limitation in physical distance or transport.

The smart space allows cross domain searches and provides a uniform, use case independent service application programming interface (API) for sharing information. As an example, the smart space allows a mobile platform to access contextual information in, e.g., a car, home, office, football stadium, etc., in a uniform way and to improve the user experience, without compromising real-time requirements of the embedded system. The smart space uses an ontology governance process as the alternative to using case-specific service API standardization. The ontology governance process agrees and adopts new vocabularies using Resource Description framework (RDF) and RDFS (RDF schema). When RDFS is not sufficient for defining and instantiating the ontologies, web ontology language (OWL) or the like is used.

In one embodiment, the RDF is used to join data from vocabularies of different domains (such as business domains), without having to negotiate structural differences between the vocabularies. In addition, the RDF allows the smart space to merge the information of the embedded domains with the information in web, as well as to make the vast reasoning and ontology theory, practice and tools developed by the semantic web community available for developing smart space applications. The smart space is an aggregation of individual smart spaces of private, group or public entities and the smart space makes the heterogeneous information in embedded domains available for semantic web tools. The smart space architecture expands the concept of a deductive closure towards a distributed deductive closure. The smart space architecture addresses values in application development by abolishing the need for a prior use case standardization such as those in the Digital Living Network Alliance (DLNA) domain and the Bluetooth domain. Furthermore, the smart space architecture abolishes design time freezing of the address of any used service API, such as in the case of WebServices.

The smart space architecture is different from university-driven RDF-store based approaches in getting information of embedded systems as an integral part of the search extent. The space-based approach of the smart space architecture also provides an alternative to surrendering personal data to a search engine or a service provider. The smart space architecture applies to the semantic web an end-to-end design principle which is widely applied in the Internet, since communication media can never know the needs of endpoints as well as the endpoints themselves.

Figure 12:
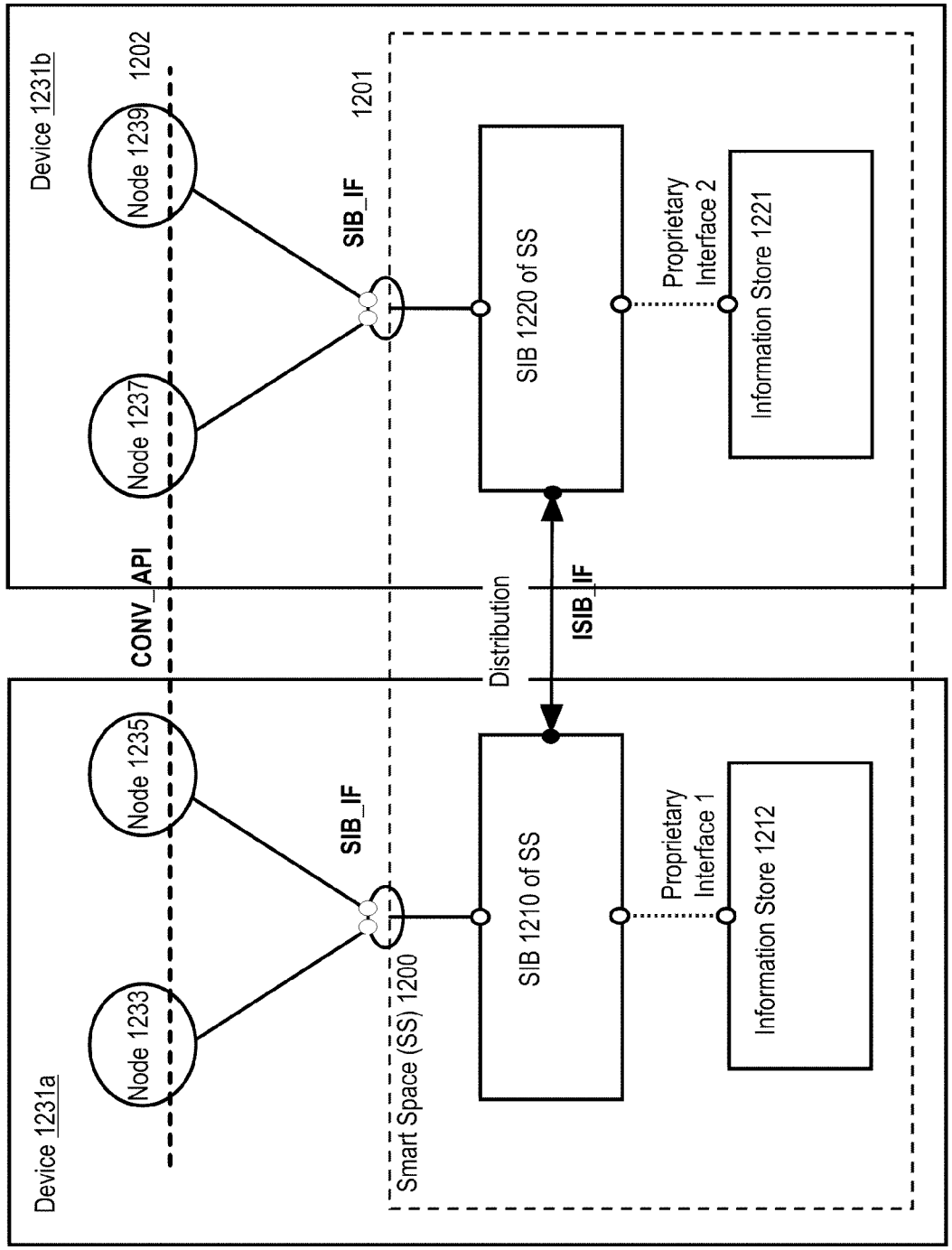
FIG. 12 is a diagram of a smart space structure for utilizing in the process of FIG. 3, according to one embodiment.

FIG. 12 is a diagram of a smart space structure for utilizing in the process of FIG. 3, according to one embodiment. Each smart space 1200 includes smart space nodes/objects 1233, 1235, 1237 and 1239 and semantic information brokers (SIB) 1210, 1220 which form the nucleus of the smart space 1200. Each SIB is an entity performing triple governance in possible co-operation with other SIBs for one smart space. A SIB may be a concrete or virtual entity. Each SIB also supports the smart space nodes/objects 1233, 1235, 1237 and 1239 (e.g., a user, a mobile terminal, or a PC) interacting with other SIBs through information transaction operations required by the system 100, such as accessing various information records for data mining thereby out-reaching the targeted recipients. Any participants of the system 100 can also post their background information at any node or information stores to make the information available for the system 100 to match with different sets of recipient criteria.

From the perspective of the recipients, they do not have to sign-up with any commercial, professional, or social network website in order to receive the above-described messages. Any information the recipients ever provide to a public and/or private entity in the real world or in the virtual world can be incorporated into the smart space as granted by the recipients/participants. The entity can be a real world legal entity or a virtual entity (e.g., an avatar). For example, the information records include the government records (e.g., birth certificates, school records, driver's licenses, tax records, real property records, criminal records, etc.), commercial activity records (e.g., flight tickets, movie tickets, CD/DVD/book purchases, restaurant/store/hospital/gym visits, car/house/education loans, credit debts, phone/utility/heating bills, internet browsing behaviors, etc.), personal activity records (e.g., basketball teams, hikes, etc.). The system 100 datamines the information records to uncover patterns of the recipients in data either with or without their real-world identification. When the system 100 is allowed by the recipients only to data-mine without associating the information with their real-world identification, the system 100 can associate the data mining results with a reference that may be tied to an alias of the recipient such that the system 100 can send messages to the recipient later. The above-described embodiments reach the recipients over a secure, encrypted mechanism to ensure total confidentiality. The system 100 protect the privacy and confidentiality of the recipients by eliminate the sender's need to know the recipient identification (e.g., names, email addresses, etc.). The system 100 uses the information regarding the messages and the corresponding recipients with authorization of the senders and the recipients.

The devices 1231a, 1231b may be any devices (e.g., a mobile terminal, a personal computer, etc.) or equipment (e.g., a server, a router, etc.). By way of example, RDF is used in the smart space 1200. The triple governance transactions in the smart space 1200 uses a smart space Access Protocol (SSAP) to, e.g., join, leave, insert, remove, update, query, subscribe, unsubscribe information (e.g., in a unit of a triple). A subscription is a special query that is used to trigger reactions to persistent queries for information. Persistent queries are particular cases of plain queries.

The physical distribution protocol of a smart space (i.e., SSAP) allows formation of a smart space using multiple SIBs. With transactional operations, a node/object produces/inserts and consumes/queries information in the smart space 1200. As distributed SIBs belong to the same smart space 1200, query and subscription operations cover the whole information extent of a smart space.

FIG. 12 also shows an implementation structure of the system 100 in the smart space (SS) 1200, the smart space 1200 is depicted in the box in a broken line 1201 (as the boundary of the smart space). There are two devices 1231a, 1231b connected to the smart space. In the upper part of FIG. 12, a dotted line 1202 shows the boundaries of the devices. The devices can be mobile terminals, personal computers, servers, or the like. Each device has nodes (e.g., two) therein. Each node represents a knowledge processor (KP). KPs are entities contributing to inserting and removing contents as well as querying and subscribing content according to ontology relevant to its defined functionality. A KP needs one or more partner KPs for sharing content and for implementing an agreed semantics for the used ontology. With this implementation structure, the smart space 1200 serves private and public entities in different domains A, B using the devices 1231a, 1231b and KPs running in the domains A, in order to support the private and public entities to access information services and the system 100.

In this embodiment, the internal and external AugBDD tables are embedded in the SSAP protocol at SIB_IF or ISIB_IF upon an "insert" protocol message. The system 100 builds itself on top of the smart space protocol, to uses ontological constructs for processing RDF graphs, ROBDDs, hash identifiers for the recipient criteria and the secret data. The SIB_IF is an interface between the SIBs and a device, and the ISIB_IF is an interface between two SIBs.

In one embodiment, the approach described herein is implemented at the interfaces SIB_IF and ISIB_IF of the system 100 to transmit the hash IDs and the encrypted secret data packets. In other embodiments, one or more application programming interfaces (APIs) (e.g., third party APIs) can be used in addition to or instead of SIB_IF and ISIB_IF. The approach described herein provides performance gains while allowing multiple proprietary implementations of information stores in the smart space 1200 according to FIG. 12. The decoding complexity for developing an application is buried below a convenience API (CONV_API) according to FIG. 12. Similarly, the tools for a local (at the node level) information search are provided as a part of a convenience library.

As discussed, the augmentation of construction history and other information related to the ROBDD of the recipient criteria and secret data are embedded in the corresponding AugBDDs. In one embodiment, the smart space protocol messages are checked for hash ID consistency by (1) checking for the correct (according to ontology) types of hash IDs in term of a range and a domain of the instances that have a defined property between them, and (2) checking for a correct number of hash IDs connected by the defined properties. In other words, the (1) and (2) mechanisms are applied to detect the smart_space_robdd_id concept within the smart space messages and then perform the checking for the availability of hash IDs from the external index table. The request for a missing hash ID can then be executed via a smart space query. This query relies upon the ROBDD graphs being available in a SIB in the smart space. The AugBDDs can be sent over to a remote system that uses the AugBDDs locally to check the consistency of the hash IDs or other properties in local information stores, which allows checking for ontology conformance without direct access to the ontology description.

One of the problems of sharing information in the semantic web is to share the graphs or parts of the graphs (i.e., subgraphs) among distributed nodes and entities via information stores with sufficient identification of the graphs (especially the subgraphs) while minimizing communication traffic. Private smart space allows each entity to set the shared portions of the smart space with different entities.

As described, the above-described embodiments independently encrypts without collaboration, input, or creating any direct relationships to the intended recipients. Instead, the encryption is based on criteria defining who the recipients might be without specifically identifying the recipients. In addition, the above-described embodiments do not require maintenance of database including pairs of a decryption key a recipient criterion.

To search for the encrypted information in cloud, the smart space offers a local solution and a centralized solution to a querier (e.g., a node, an information store, or a combination thereof) in the smart space. According to the local solution, the querier queries the smart space by means of smart space primitives: Query (*,:SP_IBE_content,*) and obtains a list of suitable candidates: [(msg_1,C_ID_1), (msg_2, C_ID_2), . . . ]. The querier can query for only the criteria without the encrypted content.

By way of example, the querier has a specific model of antique car and looks for people to repair that antique car. The querier sends out a query with its own criteria C': "owning a specific model of antique car," to find out what kinds of matching recipient criteria C are available. The matching recipient criteria C may be "previously owned and looking to buy the specific model of antique car," "owning and having remolded eight of the specific model of antique car," "model car kits of the specific model of antique car for sale," etc. The querier then queries for the encrypted content if the querier is interested in certain matching recipient criteria C, such as "owning and having remolded 8 of the specific model of antique car."

The querier criteria C' can be reduced to ROBDD and then encoded as a hash ID as the recipient criteria C as discussed previously. These AugBDD and hash IDs are locally available to the querier. The querier can easily deduce whether it has the same secret data available by searching within its own AugBDD database. The AugBDD solution allows efficient retrieval or reconstruction of ROBDDs.

In one embodiment, the querier compares individual hash IDs of the querier criteria C' to local hash IDs the recipient criteria C by a simple equality check. In another embodiment, the querier checks the inclusion of each potential criteria candidate to the whole graph of local information via AugBDD inclusion. If a match is found between the querier hash ID and C_ID_1, the information store or the querier can decrypt the secret information in the message (e.g., msg_1).

To obtain a decryption key for the encrypted secret content, the querier can pass C_ID_1 to an information store in the cloud and offers, if necessary, the ROBDD graph as proof that the querier satisfying the recipient criteria C. The querier then receives from the cloud a decryption key to decrypt the encrypted content.

This local solution counts on the querier to find the matching recipient criteria C. The local solution does not require much support from the cloud besides making the recipient criteria C and the encrypted content available for querying.

On the other hand, the centralized solution counts on the cloud or information space to be active. The querier offers to the cloud a representation of its own local information as the querier criteria. The querier criteria may be all or a part of information of the querier. If the querier is a node, the information may include user personality feature such as age, gender, personal interest, etc.; technical capability of receiving device such as digital rights management compliance; device usage patterns; environmental conditions in which the device is used; context information associated with the device such as location, time, day; other predetermined conditions; or a combination thereof.

If the querier is an information store, the information may include information store feature such as terms of sale, terms of service, gift certificate, membership cards, content codes and allowances, application store terms and conditions, licensed application end user license agreement, privacy, etc.; technical capability of store facilities such as digital rights management compliance, usage patterns, configuration conditions in which the store is used; context information associated with the store such as location, time, day; customer care and supports; consumer review, rating, accreditation; customer complaint history, government actions (e.g., antitrust, etc.), class actions and other litigations (e.g., product liabilities, etc.); other predetermined conditions; or a combination thereof. The part of information of the querier is a subset of the information selected by the querier by some criteria. In this case, the querier may offer several criteria in sequence to the cloud.

The cloud performs the comparison of the offered criteria by the mechanisms as described above. When the querier is a node, the cloud including all the information stores functions like one integrated information store appears to the node. When the querier is an information store, the cloud including all other information stores functions like one integrated information store appears to the information store. In other words, the querier does not have to interact with information stores one-by-one, but interacting with the cloud as a unit.

When an offered querier criteria C' matches with one or more recipient criteria C, the cloud indicates to the querier that decryption is feasible. The querier may then initiate the process for obtaining the decryption key as explained above in conjunction with FIG. 4. The smart space allows the sender and a querier to set up a decision-tree type of operational instructions in conjunction with different criteria, such that the information store can execute different operations under different criteria.

Matches are defaulted as 100%, unless the sender or the querier specifies otherwise. Otherwise, matches can be satisfied by a predetermined percentage other than 100%. By way of example, the recipient criteria requires married males age between 35-45 with multiple children, while the querier is a married male age between 41 with one child. When the criteria are partially matched, the cloud may present the fully and/or partially matched recipient criteria to the querier.

In another embodiment, the cloud presents to the querier only the partially matched part of the recipient criteria (e.g., married males age between 35-45). The cloud then negotiates with the querier for additional querier criteria (e.g., a survey for personal information) to find out more about the querier for data mining. After the survey, the cloud then presents other parts of the recipient criteria that the querier is determined to be eligible to know.

When there are multiple matches, the cloud may present all of the matched recipient criteria to the querier. In another embodiment, the cloud presents to the querier only some of the shorter matched recipient criteria (e.g., married males age between 35-45 with multiple children) that the querier matches. The cloud then negotiates with the querier for additional querier criteria to find out more about the querier, and then presents other longer recipient criteria (married males age between 35-45 with one house and multiple children) that the querier is determined to be eligible to know.

The above-described embodiments operating in the smart space allow novel marketing approaches. Taking targeted marketing as an example, after outreaching the anonymous recipients, the system 100 can use pre-existing social networks of the anonymous recipients to produce increases in brand awareness or to achieve other marketing objectives (such as product sales). This kind of promotions may take the form of video clips, interactive games, ebooks, brandable software, images, or even text messages.

The processes described herein for querying content protected by identity-based encryption may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
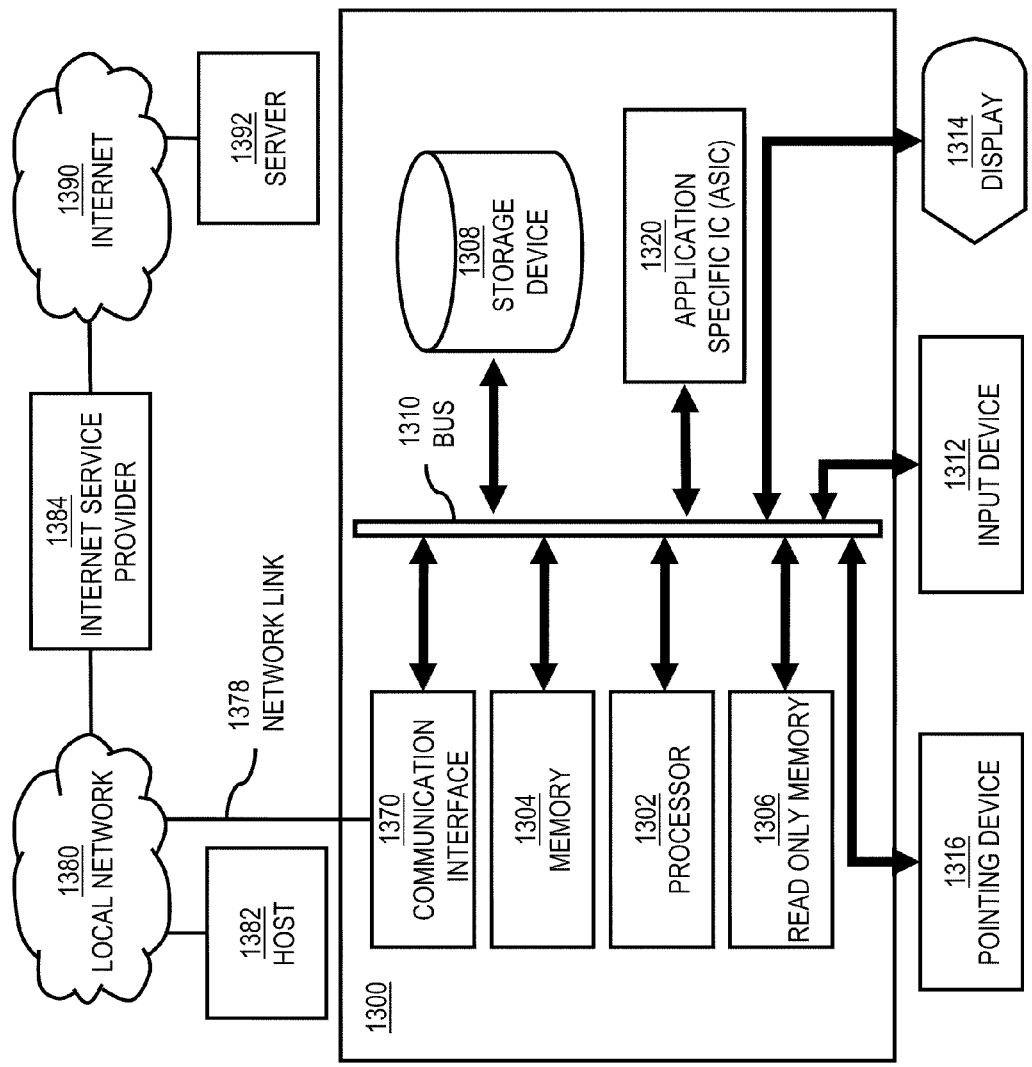
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to query content protected by identity-based encryption as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of querying content protected by identity-based encryption.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to query content protected by identity-based encryption. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for querying content protected by identity-based encryption. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for querying content protected by identity-based encryption, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 105 for querying content protected by identity-based encryption.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention.

Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to query content protected by identity-based encryption as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of services. Chip set or chip 1400, or a portion thereof, constitutes a means for performing one or more steps of querying content protected by identity-based encryption.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to query content protected by identity-based encryption. The memory 1405 also stores the data associated with or generated by the execution of the inventive steps.

Figure 15:
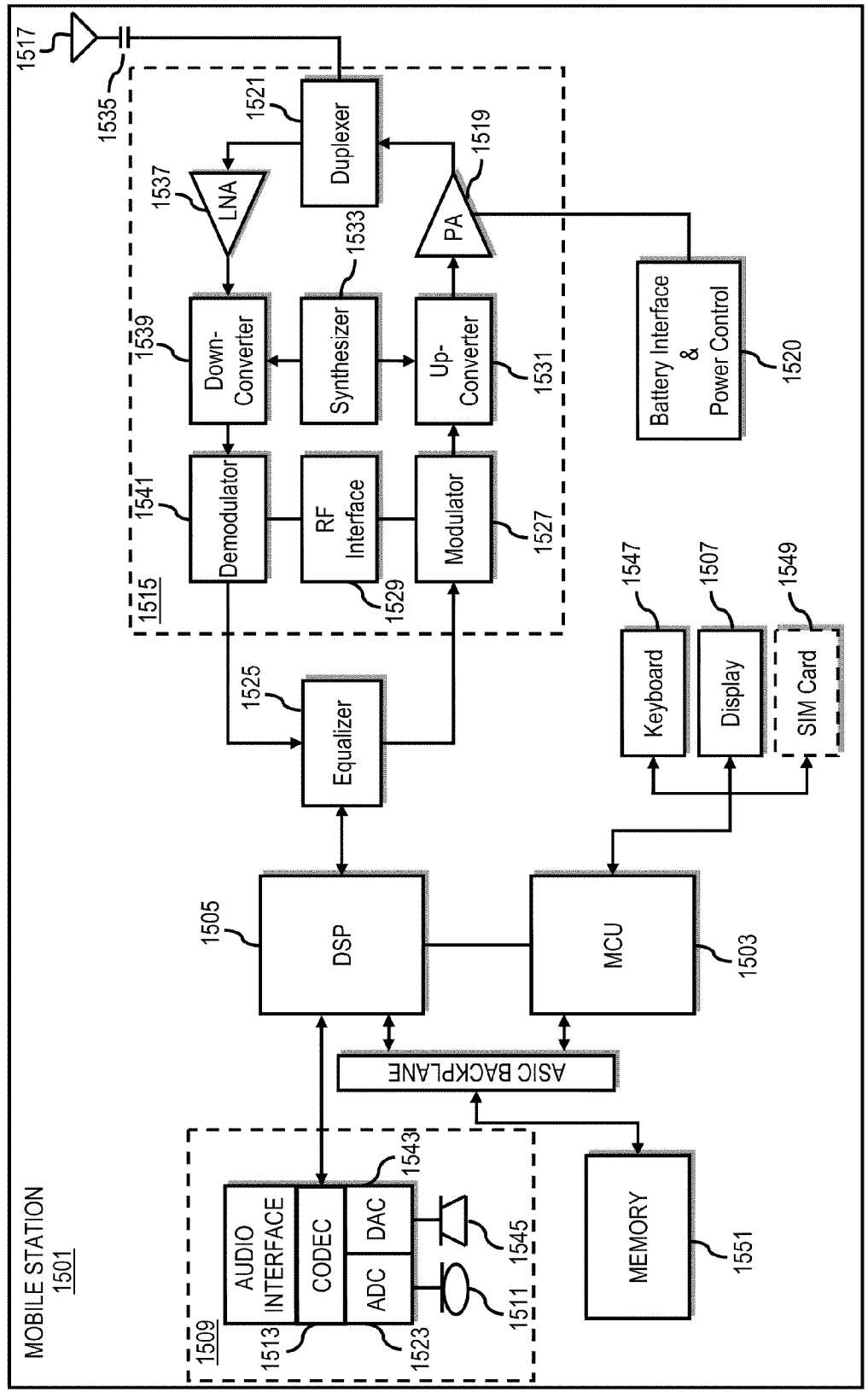
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1500, or a portion thereof, constitutes a means for performing one or more steps of querying content protected by identity-based encryption. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of querying content protected by identity-based encryption. The display 15 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to query content protected by identity-based encryption. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving at a first user device a query from a second user device for encrypted data, the query being associated with a first user, the first user being described according to a first set of criteria;
based, at least in part, on the query and one or more second sets of criteria associated with a second user, determining by the first user device whether at least one of the second sets of criteria are matched, at least in part, to the first set of criteria; and
associating by the first user device the query with the matched at least one of the second sets of criteria used as a public key for encrypting the encrypted data according to an identity-based encryption scheme,
wherein the first set of criteria and the at least one of the second sets of criteria include one or more digital right management compliant requirements.

2. A method of claim 1, further comprising:
causing, at least in part, presentation of the matched at least one of the second sets of criteria to the second user,
receiving an input, from the second user, for selecting one of the matched at least one of the second sets of criteria;
causing, at least in part, reception by the second user device of the encrypted data, wherein the encrypted data was encrypted by the first user to share with others before the query is transmitted; and
causing, at least in part, decryption by the second user device the encrypted data based, at least in part, on the selected second set of criteria.

3. A method of claim 2, wherein the decryption further comprises:
causing, at least in part, transmission by the second user device a request for a decryption key for the selected second set of criteria;
verifying that the second user satisfies the selected one of the second sets of criteria by determining one or more access rights of the second user; and
causing, at least in part, transmission of the decryption key to the second user device in response to the request upon verifying that the second user satisfies the selected one of the second sets of criteria,
wherein the decryption is based, at least in part, on the decryption key.

4. A method of claim 1, wherein an information store maintains the set of criteria associated with the first user, the method further comprising:
negotiating with the information store to store, publish, keep confidential, or a combination thereof all or some of the first set of criteria.

5. A method of claim 1, further comprising at least one of:
formatting the first set of criteria, the second sets of criteria, the query, the encrypted data, or a combination thereof respectively into predetermined information representation structures;
constructing reduced ordered binary decision diagrams from the information representation structures; and
computing a hash identifier corresponding to respective ones of the reduced ordered binary decision diagrams,
wherein the first set of criteria, the second sets of criteria, the query, the encrypted data, or a combination thereof are transmitted or received in as at least one of the information representation structure, the reduced ordered binary decision diagram, and the hash identifier.

6. An apparatus comprising:
at least one processor; and
at least one memory including computer program code,
the at least one memory and the computer program code configured to, with the at least one processor, cause the apparatus embedded in a first user device to perform at least the following,
receive a query from a second user device for encrypted data, the query being associated with a first user, the first user being described according to a first set of criteria;
based, at least in part, on the query and one or more second sets of criteria associated with a second user, determine whether at least one of the second sets of criteria are matched, at least in part, to the first set of criteria; and
set the matched at least one of the second sets of criteria as a public key for encrypting data, associated with the query, according to an identity-based encryption scheme,
wherein the first set of criteria and the at least one of the second sets of criteria include one or more digital right management compliant requirements.

7. An apparatus of claim 6, wherein the apparatus is further caused to:
cause, at least in part, presentation of the matched at least one of the second sets of criteria to the second user,
receive an input, from the second user, for selecting one of the matched at least one of the second sets of criteria;
cause, at least in part, reception by the second user device of the encrypted data, wherein the encrypted data was encrypted by the first user to share with others before the query is transmitted; and
cause, at least in part, decryption by the second user device the encrypted data based, at least in part, on the selected second set of criteria.

8. An apparatus of claim 7, wherein the apparatus is further caused to:
cause, at least in part, transmission by the second user device a request for a decryption key for the selected second set of criteria;
verify that the second user satisfies the selected one of the second sets of criteria by determining one or more access rights of the second user; and
cause, at least in part, transmission of the decryption key to the second user device in response to the request upon verifying that the second user satisfies the selected one of the second sets of criteria,
wherein the decryption is based, at least in part, on the decryption key.

9. A method comprising:
receiving at one or more second user devices a query sent from a first user device as made by a first user for encrypted data, the first user being described according to a first set of criteria;
matching, by the one or more second user devices, one or more second sets of criteria with all or part of the first set of criteria, wherein the matching defines respective second users who are qualified to receive the query, and wherein at least one of the second sets of criteria is matched with all or part of the first set of criteria and was used by a respective second user as a public key for encrypting data to be shared with others, the encrypted data is associated with the respective second user and was encrypted according to an identity-based encryption scheme; and
causing, at least in part, transmission of the at least one of the second sets of criteria to the first user device,
wherein the first set of criteria and the at least one of the second sets of criteria include one or more digital right management compliant requirements.

10. A method of claim 9, wherein the first set of criteria, the second sets of criteria, or a combination thereof include at least one of a user personality feature, a technical capability of the first device, a usage pattern of the first device, an environmental condition in which the first device is used, and context information associated with the first device.

11. A method of claim 9, further comprising:
receiving a request, from the first user device, for a decryption key for the matched at least one of the second sets of criteria;
causing, at least in part, verification of whether the first set of criteria substantially describe the first user; and
causing, at least in part, transmission of the decryption key based, at least in part, on the verification.

12. A method of claim 11, wherein the verification comprises at least one of:
determining one or more access rights associated with the first user; and
causing, at least in part, comparison of all or part of the first set of criteria against information associated with the first user that is available locally or externally, the information including an online or offline public record, a transaction history, an activity history, a history of visited locations, an interaction history, associated communication content items, associated memberships, or a combination thereof.

13. A method of claim 11, wherein the verification and the transmission are performed by a private key generator, the information store, or a combination thereof.

14. An apparatus comprising:
at least one processor; and
at least one memory including computer program code,
the at least one memory and the computer program code configured to, with the at least one processor, cause the apparatus embedded in one of a plurality of second user devices to perform at least the following,
receive a query sent from a first user device as made by a first user for data that is encrypted, the first user being described according to a first set of criteria;
match one or more second sets of criteria with all or part of the first set of criteria, wherein the matching defines respective second users who are qualified to receive the query for data, and wherein at least one of the second sets of criteria is matched with all or part of the first set of criteria and was used by a respective second user as a public key for encrypting data to be shared with others, the encrypted data is associated with the respective second user and was encrypted according to an identity-based encryption scheme; and
cause, at least in part, transmission of the at least one of the second sets of criteria to the first user device,
wherein the first set of criteria and the at least one of the second sets of criteria include one or more digital right management compliant requirements.

15. An apparatus of claim 14, wherein the first set of criteria, the second sets of criteria, or a combination thereof include at least one of a user personality feature, a technical capability of the first device, a usage pattern of the first device, an environmental condition in which the first device is used, and context information associated with the first device.

16. An apparatus of claim 14, wherein the apparatus is further caused to:
receive a request, from the first user device, for a decryption key for the matched at least one of the second sets of criteria;
cause, at least in part, verification of whether the first set of criteria substantially describe the first user; and
cause, at least in part, transmission of the decryption key based, at least in part, on the verification.

17. An apparatus of claim 16, wherein in performing verification, the apparatus is further caused to:
determine one or more access rights associated with the first user; and
cause, at least in part, comparison of all or part of the first set of criteria against information associated with the first user that is available locally or externally, the information including an online or offline public record, a transaction history, an activity history, a history of visited locations, an interaction history, associated communication content items, associated memberships, or a combination thereof.

18. A method of claim 1, further comprising:
formatting by the first user device the public key into a predetermined information representation structure;
constructing by the first user device a reduced ordered binary decision diagram from the information representation structure of the public key; and
causing, at last in part by the first user device, storage of the decision diagram of the public key.

19. A method of claim 1, wherein the first set of criteria and the second set of criteria include one or more physical features, one or more personal interests, or a combination thereof, of the first user, the second user, or a combination thereof.

20. A method of claim 5, wherein the one or more digital right management compliant requirements are formatted into one or more portions of predetermined information representation structures and constructed as one or more portions of the reduced ordered binary decision diagrams.

* * * * *